United States Patent
Ahire et al.

(10) Patent No.: US 12,049,009 B2
(45) Date of Patent: *Jul. 30, 2024

(54) SYSTEM AND METHOD FOR AUTONOMOUSLY SCANNING AND PROCESSING A PART

(71) Applicant: GrayMatter Robotics Inc., Los Angeles, CA (US)

(72) Inventors: Avadhoot L. Ahire, Los Angeles, CA (US); Rishav Guha, Los Angeles, CA (US); Satyandra K. Gupta, Los Angeles, CA (US); Ariyan M. Kabir, Los Angeles, CA (US); Brual C Shah, Los Angeles, CA (US)

(73) Assignee: GrayMatter Robotics Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,470

(22) Filed: Feb. 17, 2023

(65) Prior Publication Data
US 2023/0278207 A1     Sep. 7, 2023

Related U.S. Application Data

(63) Continuation of application No. 17/829,193, filed on May 31, 2022, now Pat. No. 11,613,014, which is a
(Continued)

(51) Int. Cl.
*B24B 51/00*     (2006.01)
*B25J 9/16*     (2006.01)
(Continued)

(52) U.S. Cl.
CPC ............ *B25J 9/1653* (2013.01); *B24B 51/00* (2013.01); *B25J 9/163* (2013.01); *B25J 9/1664* (2013.01);
(Continued)

(58) Field of Classification Search
CPC ........ B25J 9/1653; B25J 9/163; B25J 9/1664; B25J 9/1679; B25J 9/1697; B25J 11/0065;
(Continued)

(56) References Cited

U.S. PATENT DOCUMENTS 11,613,014 B2 * 3/2023 Ahire ..................... B25J 9/1697
                                                                       700/245
2018/0236623 A1 * 8/2018 Robinson .............. B24B 53/003
(Continued)

*Primary Examiner* — Robert T Nguyen
(74) *Attorney, Agent, or Firm* — Run8 Patent Group, LLC; Peter Miller

(57) ABSTRACT

One variation of a method for autonomously scanning and processing a part includes: collecting a set of images depicting a part positioned within a work zone adjacent a robotic system; assembling the set of images into a part model representing the part. The method includes segmenting areas of the part model—delineated by local radii of curvature, edges, or color boundaries—into target zones for processing by the robotic system and exclusion zones avoided by the robotic system. The method includes: projecting a set of keypoints onto the target zone of part model defining positions, orientations, and target forces of a sanding head applied at locations on the part model; assembling the set of keypoints into a toolpath and projecting the toolpath onto the target zone of the part model; and transmitting the toolpath to a robotic system to execute the toolpath on the part within the work zone.

19 Claims, 6 Drawing Sheets

Related U.S. Application Data continuation of application No. 17/826,840, filed on May 27, 2022, which is a continuation-in-part of application No. 17/390,885, filed on Jul. 31, 2021, now abandoned.

(60) Provisional application No. 63/059,932, filed on Jul. 31, 2020.

(51) Int. Cl.
   *B25J 11/00* (2006.01)
   *B25J 13/08* (2006.01)
   *G06T 1/00* (2006.01)
   *G06T 7/13* (2017.01)
   *G06T 7/60* (2017.01)
   *G06T 19/00* (2011.01)

(52) U.S. Cl.
   CPC .......... *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search
   CPC ..... B25J 13/085; B25J 15/0019; B24B 51/00; G06T 1/0014; G06T 7/13; G06T 7/60; G06T 19/00; G06T 2207/10024; G06T 2219/004; G05B 2219/40252; G05B 2219/45082; G05B 2219/49007; G05B 2219/49008; Y10S 901/41
   See application file for complete search history.

(56) References Cited

U.S. PATENT DOCUMENTS

| | | | | |
|---|---|---|---|---|
| 2020/0171620 | A1* | 6/2020 | Aubin | B24B 49/12 |
| 2020/0254617 | A1* | 8/2020 | Aldridge | B25J 9/1697 |
| 2021/0164500 | A1* | 6/2021 | Rautenbach | B25J 9/1633 |
| 2023/0049155 | A1* | 2/2023 | Koenke | B25J 13/085 |
| 2023/0278207 | A1* | 9/2023 | Ahire | B25J 9/163 700/245 |

* cited by examiner

SYSTEM AND METHOD FOR AUTONOMOUSLY SCANNING AND PROCESSING A PART

CROSS-REFERENCE TO RELATED APPLICATIONS

This application is a continuation of U.S. application Ser. No. 17/829,193, filed on 31 May 2022, which is a continuation of U.S. application Ser. No. 17/826,840, filed on 27 May 2022, which is a continuation-in-part of U.S. application Ser. No. 17/390,885, filed on 31 Jul. 2021, which claims the benefit of U.S. Provisional Application No. 63/059,932, filed on 31 Jul. 2020, each of which is incorporated in its entirety by this reference.

TECHNICAL FIELD

This invention relates generally to the field of automated finishing and more specifically to a new and useful method for autonomously processing a part in the field of automated finishing.

DESCRIPTION OF THE EMBODIMENTS

Figure 1:
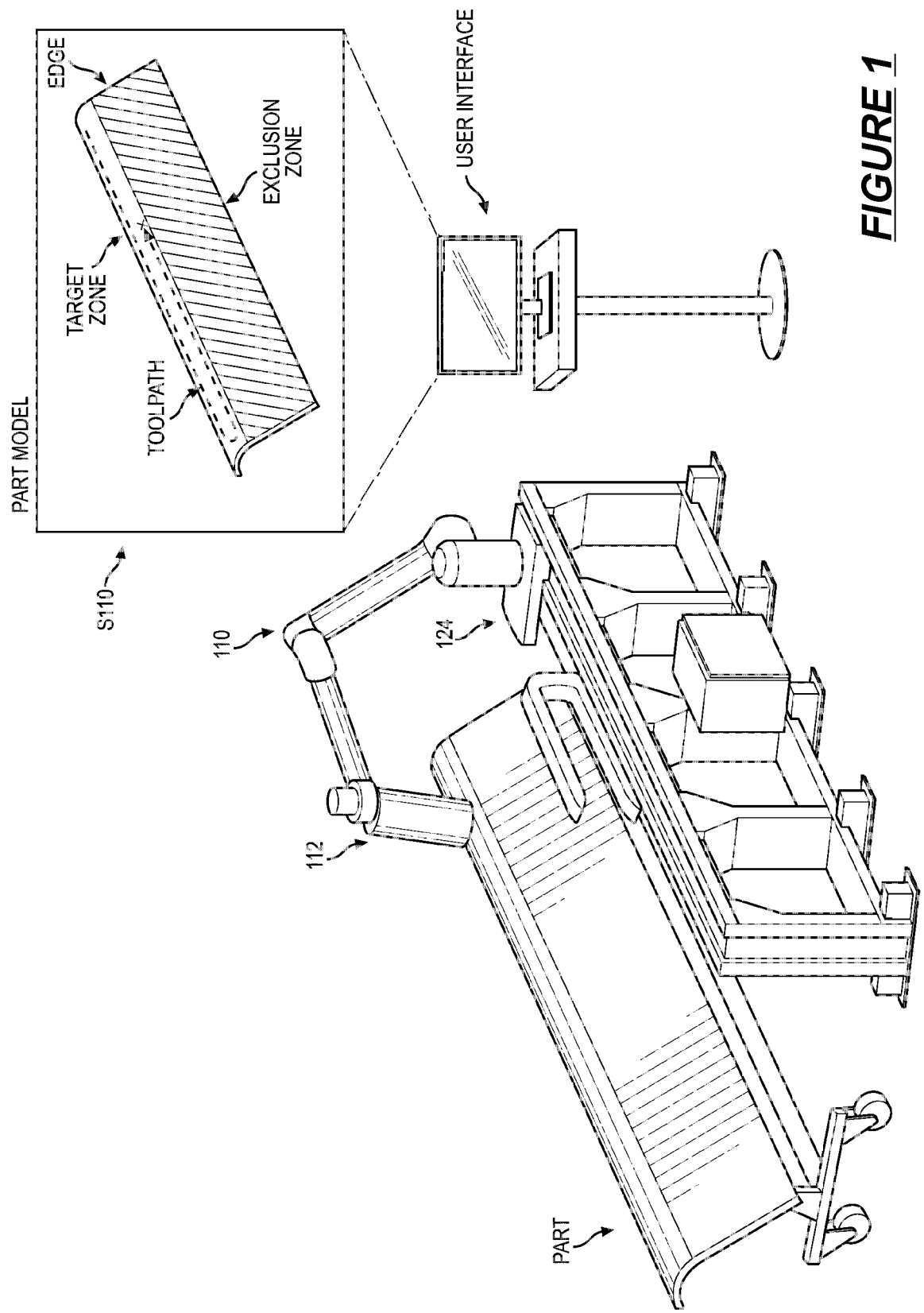
FIG. 1 is a schematic representation of a first method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1-6, a system 100 for autonomously scanning and processing a part includes a robotic manipulator 110 arranged adjacent a work zone, including an end effector 112 defining a sanding head 120 and an optical sensor 114. The robotic manipulator 110 is configured to, during a scan period: autonomously translate an optical sensor 114 across a part arranged within the work zone; and capture a set of optical images. The robotic manipulator 110 is further configured to, during a processing period: move the sanding head 120 along a toolpath; monitor a force value of the sanding head 120 on the part; and deviate from the toolpath to align the force value to a target sanding force on the part.

The system 100 further includes a controller 115 configured to, during the scan period: receive the set of optical images; assemble the set of optical images into a part model representing the part; access a set of tool characteristics of the sanding head 120 mounted to the robotic manipulator 110; generate the tool path defining a sequence of positions along the part model; and define the target sanding force based on the set of tool characteristics.

2. Method

As shown in FIGS. 1-6, a method S100 for autonomously scanning and processing a part includes, during a scan cycle: autonomously manipulating a robotic system to move an optical sensor 114 across a part loaded into a work zone; and, at the optical sensor 114, capturing a set of optical images depicting the part. The method S100 also includes: assembling the set of optical images (e.g., 2D images, 3D images) into a part model representing the part in Block S110; accessing a set of tool characteristics of a sanding head 120 mounted to the robotic system; characterizing surface contours within the part model; detecting a first region within the part model exhibiting a first surface contour accessible to the sanding head 120 based on the set of tool characteristics; and detecting a second region within the part model exhibiting a second surface contour inaccessible to the sanding head 120 based on the set of tool characteristics in Blocks S120, S112. The method S100 further includes: defining a set of keypoints on the first region within the part model; and, for each keypoint in the set of keypoints, defining a position of the sanding head 120 on the part, defining an orientation of the sanding head 120 on the part, defining a target force value of the sanding head 120 on the part, and assembling the set of keypoints into a toolpath for execution by the robotic system in Block S140.

One variation of the method S100 includes accessing a part model representing a part and accessing a geometry 123 of sanding pad 121 in Block S120.

This variation of the method S100 also includes: characterizing surface contours within the part model by detecting local contour radii of surface contours in Block S112; detecting a first region within the part model exhibiting a first surface contour accessible to the sanding head 120 based on the geometry 123 of sanding pad 121 in Block S120; and detecting a second region within the part model exhibiting a second surface contour inaccessible to the sanding head 120 based on the geometry 123 of sanding pad 121 Block S120.

This variation of the method S100 further includes in Block S140, generating a toolpath in by: defining a series of position and orientation pairs located in the first region of the part model; calculating a contact area of the sanding head 120 on the part at the series of position and orientation pairs based on a ratio of the geometry 123 of sanding pad 121 to the local contour radii at the series of position and orientation pairs in Block S130; and annotating the series of position and orientation pairs with a target force based on the contact area in Block S142.

Another variation of the method S100 includes: accessing a part model representing surface contours of a part loaded into a work zone proximal a robotic system and accessing a set of tool characteristics of a sanding head 120 manipulated by the robotic system, the set of tool characteristics including a geometry 123 of the sanding pad 121 and a compliance 126 of a backing 125 supporting the sanding pad 121; retrieving a toolpath pattern; and retrieving a set of nominal processing parameters in Block S140. This variation of the method S100 also includes: projecting the toolpath pattern onto the part model to define a toolpath in; and defining a set of regions along the toolpath in Block S140. This variation of the method S100 further includes, for each region in the set of regions of the toolpath: detecting a local curvature radius of surface contours represented in the part model proximal the region of the toolpath in Block S112; calculating a contact area between the sanding head 120 and the part proximal the region based on the geometry 123 of the sanding pad 121, the compliance 126 of the backing 125, and the local curvature radius in Block S130; and defining a target execution value, in a set of target execution values, of the sanding head 120 on the part based on the contact area and the set of nominal processing parameters in Block S142. This variation of the method S100 also includes, during a processing cycle, at the robotic system: navigating the sanding head 120 along the toolpath in Block S150; reading a sequence of execution values from a sensor in the robotic system in Block S152; and deviating from the toolpath to maintain the sequence of execution values within a threshold difference of the set of target execution values in Block S154.

Another variation of the method S100 includes: accessing a part model representing surface contours of a part loaded into a work zone adjacent a robotic system in; accessing a geometry 123 of a sanding head 120 manipulated by the robotic system; retrieving a toolpath pattern; projecting the toolpath pattern onto the part model to define a toolpath; and defining a set of regions along the toolpath in Block S140. This variation of the method S100 also includes, for each region in the set of regions of the toolpath: detecting a local curvature radius of surface contours represented in the part model proximal the region of the toolpath Block S112; calculating a contact area between the sanding head 120 and the part surface proximal the region and the local curvature radius Block S130; and defining a target force value, in a sequence of target force values, of the sanding head 120 on the region of the part based on the contact area Block S142. This variation of the method S100 further includes, during a processing cycle, at the robotic system: navigating the sanding head 120 along the toolpath Block S150; reading a sequence of force values from a force sensor 116 coupled to the sanding head 120 Block S152; and deviating from the toolpath to maintain the sequence of force values within a threshold difference of the sequence of target force values Block S154.

3. Applications

Generally, Blocks of the method S100 can be executed or controlled by a controller 115 (or other computer system) in conjunction with a robotic system to complete a work cycle, including autonomously scanning a part loaded into a work zone proximal the robotic system, and executing a processing protocol on the part.

The controller 115 can execute a rapid, first scan (e.g., under one minute to complete image capture, under one minute to process images into a part model) of a part loaded in the work zone to determine the dimensions and properties of the part, such as contour and color, as well as detect edges indicating features or boundaries of the part. The robotic system executes the first scan by sweeping an optical sensor 114 (e.g., an RGB color camera, a LIDAR sensor, a stereoscopic camera) over the area of the work zone to: capture a set of optical images depicting the part; detect the part within the set of images; and assemble the set of images into a three-dimensional model of the part. The controller 115 can define a toolpath executable by the robotic system in machine coordinates and project the toolpath onto the three-dimensional model.

The robotic system can then move a sanding head 120 to execute the toolpath on the part with a low accuracy (i.e., tolerance greater than 1 in.) and deviate the sanding head 120 from the toolpath to achieve a target force between the sanding head 120 and the part surface. In particular, the robotic system can orient the sanding head 120 such that an axis of rotation of the sanding head 120 is coaxial with a vector normal to the part and translate the sanding head 120 along the axis toward or away from the part to achieve the target force.

The robotic system tightly controls the force of the sanding head 120 on the part, therefore the robotic system can compensate for errors in the first scan by tightly controlling the force exerted on the part by the sanding head 120. By utilizing a first scan, the overall execution time necessary to scan and process the part (i.e., complete a work cycle) is reduced, resulting in a higher throughput for the system as opposed to a longer duration scan.

Generally, the controller 115 defines a target force to exert on the part. The target force can be constant across the part, or modulated based on the properties of the part or the parameters of the process protocol. Target force is generally defined based on: the grit 122 of a sanding pad 121 attached to the sanding head 120; the geometry 123 of sanding pad 121; the material composition of the part or coating on the part; the traversal speed of the sanding head 120 across the part; the local contour radius of the part surface along the toolpath, which determines the contact area of the sanding head 120 on the part surface; the shape of the contour (i.e., concave or convex); and the compliance 126 of a backing 125 pad supporting the sanding pad 121.

The controller 115 can access a part processing profile to define the target force on a specific part. A part processing profile contains processing protocol parameters and part attributes. Processing protocol parameters define sets of characteristics (such as grit 122 of sanding pad 121) and actions (such as translation speed) of the robotic system during a particular process such as stripping paint, preparing primer, or buffing a final paint coat. Part attributes describe inherent characteristics of a part type, such as material type, part geometry 123, and maximum pressure. The robotic system retrieves the parameters of a particular process protocol for a particular part type to execute the particular process protocol on an individual part.

The robotic system can execute the same process for a variety of part types (e.g., a paint stripping process on a car door and a furniture piece), or a variety of processes on the same part type (e.g., stripping, primer preparation, and final paint buffing on a single car hood) by selecting the correct profile or profile attributes.

A collection of part processing profiles can be pre-loaded onto the robotic system, or part processing profiles can be entered manually by an operator. Additionally or alternatively, the robotic system can access an operator profile defining operator preferences for a processing cycle, such as a sanding head 120 translation speed, a generic toolpath pattern, or default applied force value.

Therefore, the controller 115 can develop a low-tolerance toolpath (e.g., +/−one inch) on a part surface in near real-time based on a first scan of the part. The robotic system can then achieve high-resolution surface processing by achieving a target applied force of the sanding head 120 through detecting the applied force in real-time at the sanding head 120 and selectively deviating from the low-resolution toolpath to maintain the target applied force along the length of the toolpath. Thus, the robotic system achieves high resolution accuracy and high repeatability of a process protocol by combining a low-resolution scan with high accuracy target force execution derived from other processing parameters.

4 System

Figure 3:
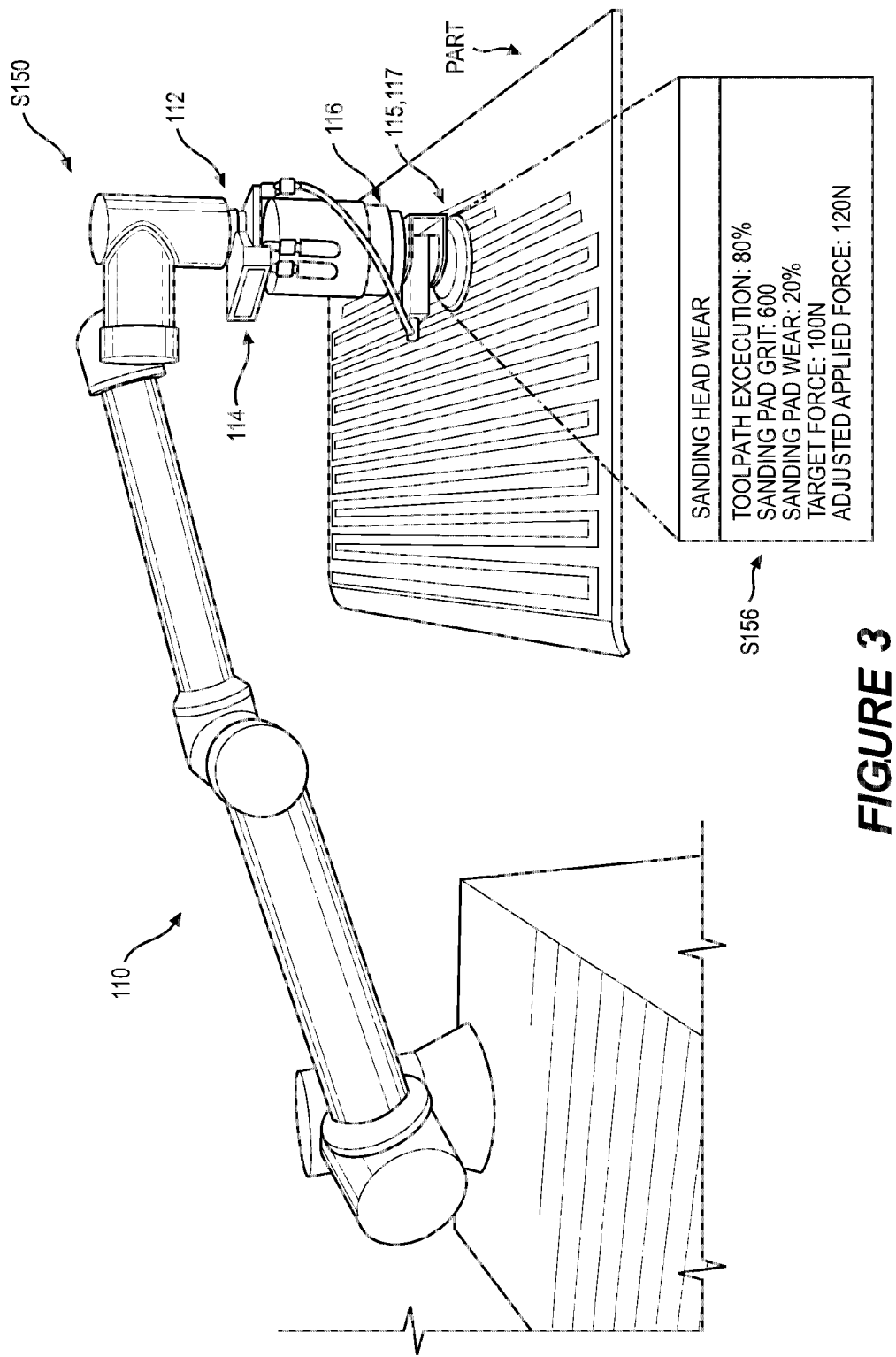
FIG. 3 is a schematic representation of a variation of the first method.
Figure 4:
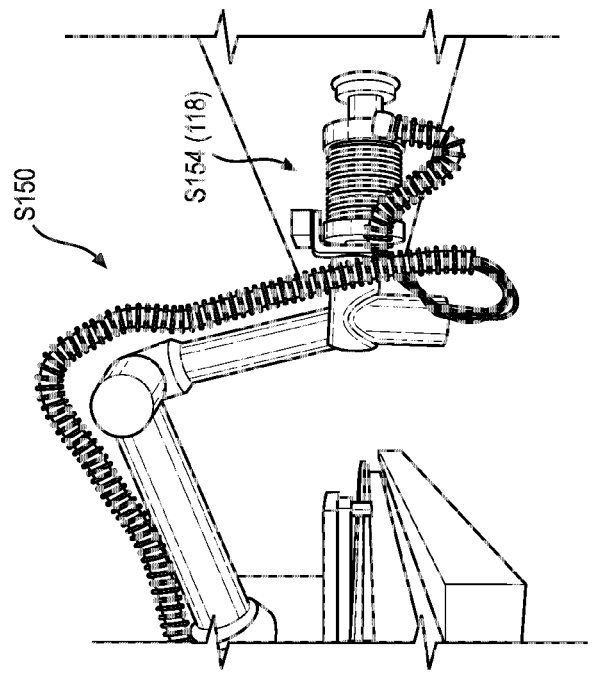
FIG. 4 is a flowchart representation of a variation of the first method.
Figure 4:
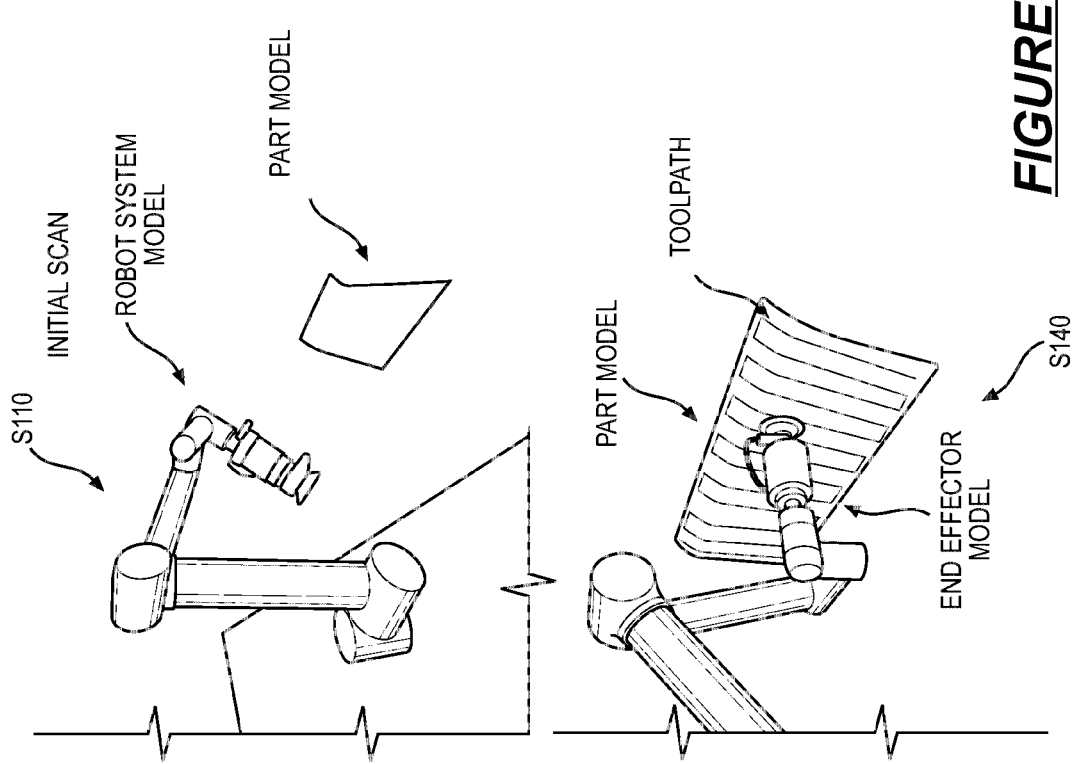

In one implementation as shown in FIGS. 1, 3, and 4, the system includes: a robotic system arranged adjacent to a work zone defining: a robotic manipulator 110 configured to translate an end effector 112, mounted to the robotic manipulator 110, through six degrees of freedom up to the spatial limits of the work zone during a work cycle.

An optical sensor 114 is mounted to the end effector 112 and configured to capture color and depth maps (i.e., a RGB color camera, a LIDAR sensor, a stereoscopic camera).

A random orbital sanding head 120 (hereinafter referred to as a "sanding head 120") is mounted to the end effector 112 and configured to rotate a sanding pad 121 (e.g., a sanding disk, a sanding sheet, a sanding wheel) affixed to a compliant backing 125. A force sensor 116 is located at the sanding head 120 and configured to detect a force on the sanding head 120 normal to the surface of the sanding pad 121 at the center of the sanding pad 121. In one variation of the implementation, the sanding head 120 is another type of abrasive device such as an orbital sander, a vibrating or "mouse" sander, a rotary tool, a wire brush wheel, etc.

In one implementation, the robotic system includes a linear actuator 118 mounted to the end effector 112 coaxial with an axis of rotation of the sanding head 120, and configured to extend and retract the sanding head 120 from the end effector 112. In one variation, the linear actuator 118 is an electromechanical actuator configured to detect resistance to extension or retraction of the sanding head 120 in real time. In another variation, the linear actuator 118 is a pneumatic cylinder including a pressure sensor configured to detect the air pressure in the cylinder in real-time.

In one example, the robotic manipulator 110 includes a force sensor 116 coupled to the sanding head 120 and configured to output signals representing the force value of the sanding head 120 normal to local areas of the part in contact with the sanding head 120. The controller 115 then defines the target sanding force normal to local areas represented in the part model and inversely proportional to radii of local areas represented in the part model.

In another example: the sanding head 120 includes a compliant backing 125: configured to locate and support a sanding pad 121; configured to elastically deform in response to application of the sanding pad 121 onto the part; and characterized by a compliance 126 coefficient. The robotic manipulator no further includes a force sensor 116 coupled to the sanding head 120 and configured to output signals representing the force value of the sanding head 120 normal to local areas of the part in contact with the sanding head 120, and the controller 115 defines the target sanding force normal to local areas of the part model and proportional to the compliance 126 coefficient.

The robotic system further includes a controller 115 configured to: control the components of the robotic system; store operator profiles and part processing profiles; assemble a set of color images (e.g., color images, stereoscopic images, depth maps) into a part model and annotate the part model with additional data; define keypoints and assemble toolpaths in machine coordinates; calculate force values based on attributes of the sanding head 120, detected attributes of the part, an operator profile, and/or a part processing profile; and present data to, and receive data from, a user via a user interface.

In one implementation, the robotic system includes additional sensors including: a force sensor 116 at an actuating joint of the robotic manipulator 110; a torque sensor arranged at the sanding head 120 configured to detect a torque value at the axis of rotation of the sanding head 120; a position sensor arranged at the sanding head 120 configured to detect rotation of the sanding head 120.

In one implementation, the robotic system includes multiple optical sensor 114*s* arranged about the perimeter of the work zone, the fields of view of the optical sensor 114*s* oriented toward the interior of the work zone, and configured to capture optical color and depth maps.

In another implementation, the robotic manipulator 110 defines a six-axis gantry arranged over work zone.

In another implementation, the robotic manipulator 110 defines a multi-link robotic arm mounted on a linear conveyor 130 configured to translate the length of the work zone.

In one example, the robotic manipulator 110 defines a multi-link robotic arm configured to manipulate the end effector 112 through six degrees of freedom proximal the part positioned in the work zone; and a linear conveyor 130 configured to translate the multi-link robotic arm the length of the work zone.

4.1 Tool Profile

In one implementation, the controller 115 stores a tool profile defining the end effector 112 dimensions, including the dimensions of the mounted optical sensor 114, and attributes of the sanding head 120 including: dimensions of sanding head 120; a geometry 123 of the sanding pad 121 (e.g., area, diameter, flat contour, concave contour, convex contour) of a currently installed sanding pad 121; a grit 122 of the currently installed sanding pad 121; a compliance 126 of the backing 125; and a sanding pad wear model defining a pad wear 127.

In one variation, wherein the robotic system includes a linear actuator 118, the tool profile further includes: linear actuator 118 dimensions; and a linear actuator 118 extension range.

The controller 115 can access the tool profile to retrieve attributes of the tool head, such as the geometry 123 of the sanding pad 121 or grit 122 of the sanding pad 121, to calculate contact area and/or target force when defining keypoints or toolpaths. Additionally, the robotic system accesses the tool profile to retrieve dimensions of the end effector 112 and connected components to model potential collisions between the end effector 112 and the part surface or elements of the part.

5. Part Loading, Operator Profile, and Part Processing Profile

In one implementation, prior to initiating a work cycle, an operator: loads a first part onto a first part carrier; arranges the first part carrier supporting the first part in the work zone; and fixes the first part carrier in position within the work zone by engaging a set of locking casters on the first part carrier.

Following the conclusion of the surface processing procedure, the operator disengages the set of locking casters on the part carrier and removing the part carrier and finished part from the work area.

5.1 Operator Profile

In one implementation, the robotic system includes an operator profile defining the operator's default preference settings for the robotic system, including: a nominal traversal speed (e.g., one foot per second, one inch per second); a nominal toolpath pattern; a nominal sanding head 120 dwell time; and/or a nominal material removal depth. Generally, the operator profile is preloaded onto the robotic system prior to a scanning period. In one variation, the operator can manually enter data into the robotic system via a user terminal to generate the operator profile.

In another variation, the operator profile defines a nominal traversal speed range defined by a maximum traversal speed and a minimum traversal speed.

In another variation, the operator can select one or multiple preferences of the operator profile to override parameters of the part processing profile.

For example, the controller 115 can apply different operator preferences in subsequent work cycles. The controller 115 retrieves a boustrophedonic raster pattern from a first operator profile associated with a first operator operating the robotic system during the first scan cycle.

The robotic system can then apply a second set of operator preferences of a second operator by: receiving a second part within the work zone and accessing a second operator profile associated with a second operator. The robotic system can then, during a scan cycle of a second work cycle corresponding to the second part: autonomously manipulate the robotic system to move the optical sensor 114 across the second part; and, at the optical sensor 114, capture a second set of optical images depicting the second part. the controller 115 then assembles the second set of optical images into a second part model representing the second part.

The controller 115 then: characterizes surface contours within the second part model; detects a first region within the second part model exhibiting a surface contour accessible to the sanding head 120 based on the set of tool characteristics; and detects a second region within the second part model exhibiting a surface contour inaccessible to the sanding head 120 based on the set of tool characteristics.

The robotic system then retrieves a perpendicular double pass boustrophedonic raster pattern from the second operator profile defining: a first sequence of raster legs in a first orientation and offset by a pitch distance less than the width of the sanding head 120; a second sequence of raster legs in a second orientation and connecting the third sequence of raster legs; a third sequence of raster legs in a third orientation perpendicular to the first orientation and offset by the pitch distance less than the width of the sanding head 120; and a fourth sequence of raster legs in a fourth orientation and connecting the third sequence of raster legs. The robotic system then projects the perpendicular double pass boustrophedonic raster pattern onto the second part model.

The robotic system then, for each keypoint in a second set of keypoints: defines a position of the sanding head 120 on the second part; defines a second orientation of the sanding head 120 on the second part; defines a target force value of the sanding head 120 on the second part; and assembles the second set of keypoints into a toolpath, following the perpendicular double pass boustrophedonic raster pattern, at local densities proportional to local radii of surface contours within the first region within the second part model, for execution by the robotic system.

Therefore, the robotic system can retrieve default preferences, such as toolpath patterns or nominal translation speeds from the operator profile to inform the process protocol applied to a part. The operator profile can override other parameter inputs to limit the actions of the robotic system, such as assigning a default translation speed of the sanding head 120 thereby limiting the maximum translation speed of the robotic system, or setting a default toolpath pattern rather than calculating a custom toolpath during each work cycle.

5.2 Part Processing Profile

In one implementation, the controller 115 stores a part processing profile defining the parameters of a particular surface process on a particular part composed of a particular material. The part processing profile is divided into two sub-profiles: a process protocol sub-profile, defining parameters of the process protocol executable by the robotic system; and a part sub-profile, defining the characteristics of the part and the properties of the material from which the part is constructed.

In this implementation, part processing profiles are assembled from various sub-profiles to generate a part processing profile defining a process protocol unique to a particular part composed of a particular material. In one variation, the part processing profile includes only the process protocol sub-profile, defining a process protocol for any part.

Part processing profiles can be pre-loaded onto the robotic system, selectable for use by an operator. Additionally or alternatively the part processing profile or a sub-profile can be generated from data manually entered by the operator.

5.2.1 Processing Protocol Sub-Profile

The process protocol sub-profile defines: a set of properties of the robotic system or system components (e.g., grit 122 of sanding pad 121, geometry 123 of the sanding pad 121, and compliance 126 of the backing 125) necessary to execute a particular process protocol, and/or a set of execution parameters governing actions performed by the robotic system while executing the process protocol, such as toolpath pattern, sanding head 120 traversal speed, and nominal target force exerted by a sanding head 120 on the part. The processing protocol profile can additionally include effect values related to the set of properties or execution parameters (e.g., material removal depth, material removal rate) derived from the set of properties and execution parameters. Alternatively, the effect value can be set by an operator. In response, the controller 115 automatically adjusts the set of properties and execution parameters to produce the effect value set by the operator.

A particular surface process can define: a process for stripping paint; a process for preparing a primer coat to receive a paint coat; and/or a process for buffing a final paint coat.

For example, the processing protocol profile can define a surface process corresponding to stripping paint, including: a coarse grit 122; a high target force; a fast traversal speed; and a high material removal depth.

In another example, the processing protocol profile can define a surface process corresponding to preparing a primer coat to receive paint, including: a moderately coarse grit 122; a moderate target force; a moderate traversal speed; and a low material removal depth.

In yet another example, a processing protocol profile can define a surface process corresponding to buffing a coat of paint, including: a very fine grit 122; a low target force; a low traversal speed; and a material removal depth of zero.

The processing protocol profile defines the robotic system properties and execution parameters required to execute a particular process protocol to achieve a surface process result on a part.

5.2.2 Part Sub-Profile

The part sub-profile includes attributes of a particular part type necessary to determine the maximum force applicable to a given area of the part without causing damage to the part or the robotic system including: a nominal curvature of the part; a material thickness; a coating type (e.g., paint to be striped, primer, bare material, finished paint to be buffed, clear coat to be polished); a coating thickness; a coating hardness; a part material type (e.g., steel, aluminum, fiberglass); a part material hardness; and an edge processing preference (i.e., avoid edges, process edges lightly).

The part profile can further include a force model, accessible by the controller 115 to calculate the nominal maximum force that can be exerted on the part surface by the robotic system without damage to the part or the robotic system, based on curvature, material thickness, coating thickness and/or coating hardness.

For example: the controller 115 can access a hardness of a coating on the part from the part sub-profile of the part loaded in the work zone; and define the set of target force values along the toolpath proportional to the hardness of the coating on the part.

In another example: the controller 115 can apply different part processing profiles to parts loaded into the work zone. The controller 115 can apply a first part processing profile to a first part by: accessing a part stripping profile assigned to the first part and specifying: a material removal depth; and a grit 122 specification of a sanding pad 121 applied to the sanding head 120. The controller 115 then defines the first set of target force values proportional to the first material removal depth and inversely proportional to the first grit 122 specification.

The controller 115 can apply a second part processing profile to a second part by receiving a second part within the work zone and accessing a paint preparation profile assigned to the second part and specifying: a second material removal depth; and a second grit 122 specification, less than the first grit 122 specification, of a second sanding pad 121 applied to the sanding head 120.

The controller 115 then, during a second scan cycle: manipulates the robotic system to move the optical sensor 114 across the second part; and, at the optical sensor 114, captures a second set of optical images depicting the second part.

The controller 115 then: assembles the second set of optical images into a second part model representing the second part; characterizes surface contours within the second part model; detects a first region within the second part model exhibiting a surface contour accessible to the sanding head 120 based on the set of tool characteristics; detects a second region within the first part model exhibiting a surface contour inaccessible to the sanding head 120 based on the set of tool characteristics; and defines a set of keypoints on the first region within the second part model. The controller 115, for each keypoint in the second set of keypoints: defines a position of the sanding head 120 on the second part; and defines an orientation of the sanding head 120 on the second part.

The controller 115 then and defines a second target force value of the sanding head 120 on the second part: proportional to the second material removal depth; and inversely proportional to the second grit 122 specification. The controller 115 finally assembles the second set of keypoints into a toolpath for execution by the robotic system.

In another example, the operator loads a part into the work zone defining a steel automobile hood of a nominal thickness of one-sixteenth of an inch. The operator selects a part processing profile corresponding to stripping paint from the steel automobile hood defining: a coarse grit 122 of sanding pad 121; a toolpath pattern defining a single boustrophedonic pass over the part surface; a slow sanding head 120 traversal speed, resulting in a high dwell time; and a large material removal depth, a nominal part curvature with a contour radius greater than twelve feet, a nominal part geometry 123 representing a quadrilateral, a nominal part thickness greater than one-sixteenth of an inch, and a nominal maximum force for steel of one-half inch thickness.

The controller 115 retrieves the parameters from the part processing profile to calculate a target force to achieve the desired finish of bare steel (i.e., paint has been stripped) along the tool path based on the parameters of the part processing profile for stripping paint from the steel automobile hood.

In another example, the operator loads a part into the work zone defining a painted steel automobile hood. The operator selects a part processing profile corresponding to buffing paint including a set of processing parameters defining: a very fine grit 122; a toolpath pattern defining a perpendicular double-pass boustrophedonic raster pattern; a slow sanding head 120 traversal speed, resulting in a high dwell time; a small material removal depth; a coating type (i.e., finished paint to be buffed); and a coating hardness.

The controller 115 retrieves the set of parameters from the part processing profile to calculate a target force less than a maximum force for finished paint defined in the part sub-profile, along the tool path to achieve the desired finish of buffed paint along the tool path.

In yet another example, the operator loads a part into the work zone defining a fiberglass wind turbine blade of a wall thickness of one-half millimeter. The operator selects a part processing profile corresponding to preparing a primer coat on the surface of the fiberglass wind turbine blade to receive paint including a set of processing parameters defining: a moderately coarse grit 122; a toolpath pattern defining a single raster pass over the part surface; a fast sanding head 120 traversal speed, resulting in a low dwell time; a small material removal depth; a nominal part curvature with a contour radius greater than two feet; a nominal part geometry 123 representing a contoured airfoil; a nominal part wall thickness greater than one-half millimeter; and a nominal maximum force for fiberglass of one-half millimeter thickness.

The robotic system retrieves the parameters from the part processing profile and calculates a target force, less than the nominal maximum force for fiberglass of one-eighth inch thickness, to achieve the desired finish of prepared primer along the tool path.

Therefore, the part processing profile contains the parameters of the part and the process parameters to effectuate surface processing of a particular part such as stripping paint, preparing a primer coating to receive a paint coating, and/or to buff a paint coating.

The part processing profile can be stored locally at the robotic system to be readily selected by an operator to process multiple instances of similar parts. Additionally, the set of pre-loaded part processing profiles enables a single operator to select from an array of part processing profiles to perform a variety of surface processes on a variety of parts exhibiting a variety of material properties on the same robotic system. Furthermore, the set of pre-loaded part processing profiles enables a single operator to process a single part through a series of surface processes on the same robotic system.

The operator profile enables the operator to set default parameters or preferences for individual processes, or for all processes performed on the robotic system, such as a uniform tool path pattern across all processes, or a uniform translation speed of the sanding head 120.

6. Part Scanning

Figure 2:
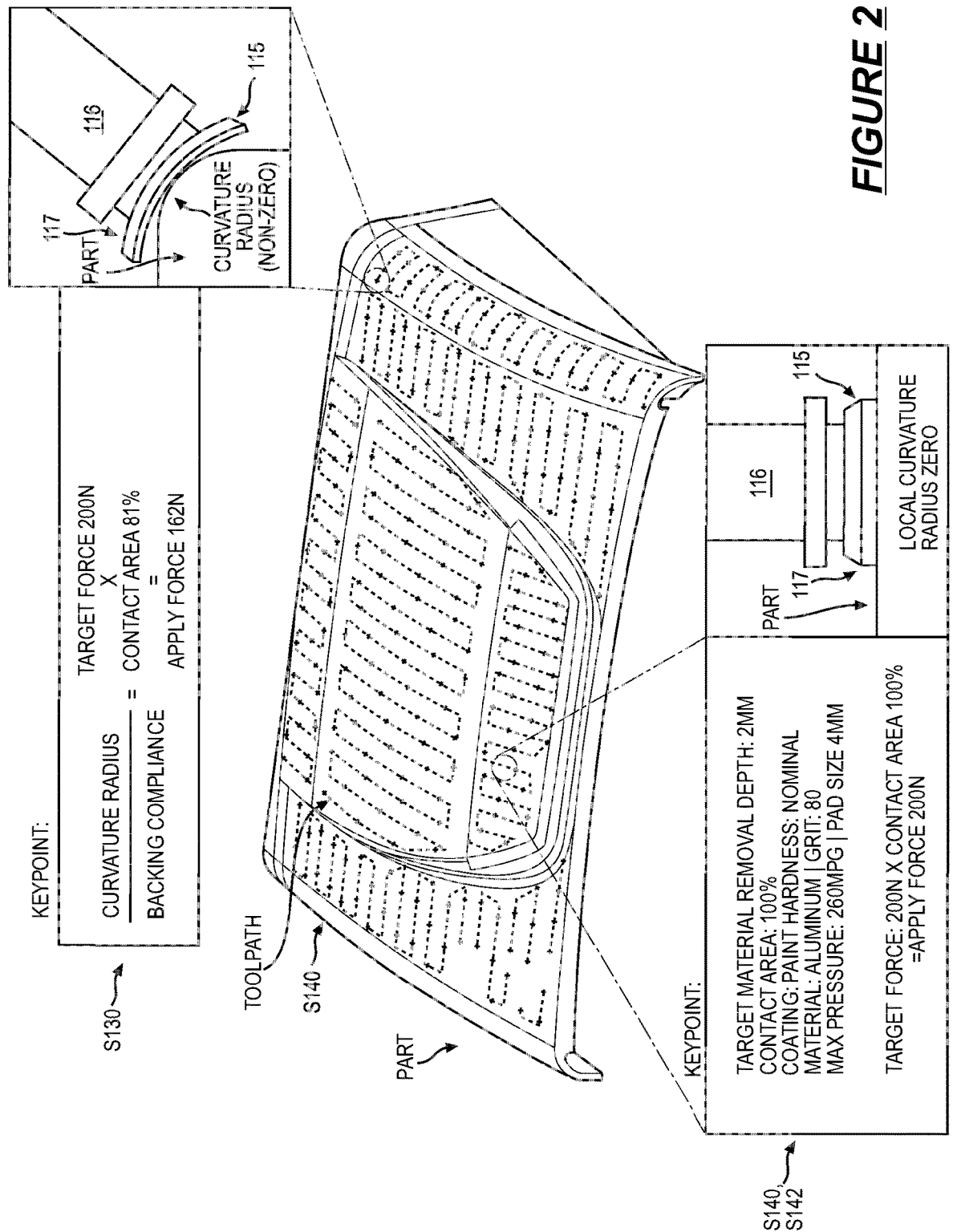
FIG. 2 is a schematic representation of a variation of the first method.

In one implementation as shown in FIGS. 1, 2 and 4, the robotic system executes a first, rapid, low-resolution scan of the work zone of the part loaded into the work zone by sweeping the optical sensor 114 across the work zone at a first distance from the floor of the work zone, to collect a set of images depicting the work zone and the part loaded therein. In particular, the robotic manipulator 110 translates the optical sensor 114, mounted to the end effector 112, to the maximum dimensions and/or to the maximum dimensions of the work zone. The controller 115 then assembles the set of images into a lower-resolution model of the part to determine the nominal geometry 123 and dimensions of the part. In one variation, the robotic system translates the optical sensor 114 to a maximum height above the center of the work zone and captures a single depth map depicting the part. The robotic system then assembles the lower-resolution part model from the single image to detect part geometry 123 and dimensions.

The robotic system then executes a second, higher-resolution scan of the part to determine part features, such as part contour, coating, internal edges or features, and boundary edges of the part. The robotic system assembles a scan pattern from the first scan by: segmenting the low-resolution part model by the area of the field of view of the optical sensor 114 at a nominal scan distance from the part (i.e., twelve inches); projecting a set of scan points onto the surface of the first scan; and defining an orientation of the focal axis of the optical sensor 114 approximately normal to the part surface.

The robotic system executes the second scan by locating a focal axis of the optical sensor 114 approximately normal to the part while maintain the optical sensor 114 at the nominal scan distance and collecting a set of images depicting the part. The controller 115 then assembles the set of images into a higher-resolution part model.

For example, the robotic system can execute the first scan to quickly determine the part boundaries and generate a nominal scan path during a setup period preceding the first scan period by: locating the optical sensor 114 over the work zone at a first distance from the first part; capturing a first optical image of the work zone depicting the first part at a first resolution; detecting a first geometry 123 of the first part within the work zone based on a first set of features extracted from the first optical image; and defining a scan path, at a second distance from the first part less than the first distance, based on the first geometry 123 of the first part within the work zone. The robotic system can then execute the second scan to capture a high-resolution representation of the part by: autonomously executing the scan path to translate the optical sensor 114 over the first part at the second distance from the first part; and capturing the first set of optical images depicting the first part at a second resolution greater than the first resolution.

Therefore, the robotic system can efficiently execute a first, lower-resolution scan to detect the geometry 123 and dimensions of the part with a low dimensional accuracy, assemble a lower-resolution part model, and segment the low-resolution part model into regions scannable by the optical sensor 114 positioned at a closer, nominal distance during a second, higher-resolution scan. The robotic system can then execute the higher-resolution scan to detect part features—such as surface contours, coatings, internal edges and features, and boundary edges of the part—at greater dimensional accuracy sufficient to define the toolpath within a spatial tolerance (e.g., +/−0.25") of the surface of the part and to define target force values along the toolpath predicted to yield consistent material removal and/or surface quality when executed by the robotic system.

7. Part Model

In one implementation as shown in FIGS. 1 2, 4-6, the controller 115 assembles two-dimensional images, depth maps, stereoscopic images, and/or other optical data—collected by the robotic system via the set of optical sensor 114s during the scan—into a three-dimensional part model representing surfaces of the part, such as within a spatial tolerance of +/−0.25".

The controller 115 can derive surface contours from the three-dimensional part model, such as by calculating a local radius of curvature at each pixel within the three-dimensional part model. The controller 115 can also: characterize a surface contour with a negative local radius as a convex contour (e.g., if the center of a sphere tangent to the part model at a pixel falls below the part surface); and characterize a surface contour with a positive local radius as a convex contour (e.g., if the center of a sphere tangent to the part model at a pixel falls above the part surface), Furthermore, the controller 115 can implement edge detection techniques to detect boundary edges of the part within the three-dimensional part model.

In one variation, the controller 115: detects color characteristics (e.g., color intensity, reflectivity) of the surface of the part model; predicts a surface type of the part (e.g., primer, paint, metal, fiberglass) based on these color characteristics; selects a part processing profile based on the surface type; and/or delineates segments of the part model between regions exhibiting distinct color characteristics (e.g., high reflectivity indicating paint versus low reflectivity indicating primer or filler).

Therefore, the controller 115 can assemble a part model from the set of images collected by the robotic system during the scan cycle to define the boundaries of the part and the contours of the part, thereby producing a virtual representation of the part. The controller 115 then calculates a toolpath and parameters for autonomously processing the part based on this part model.

7.1 Part Model Segmentation

Generally, the controller 115 segments the part model into a set of target zones that the robotic manipulator 110 will process with the sanding head 120 and a set of exclusion zones inaccessible or unsuitable for the robotic manipulator 110 to process with the sanding head 120, based on the capabilities of the robotic system and the desired surface finish.

7.1.1 Target Zones

Figure 5:
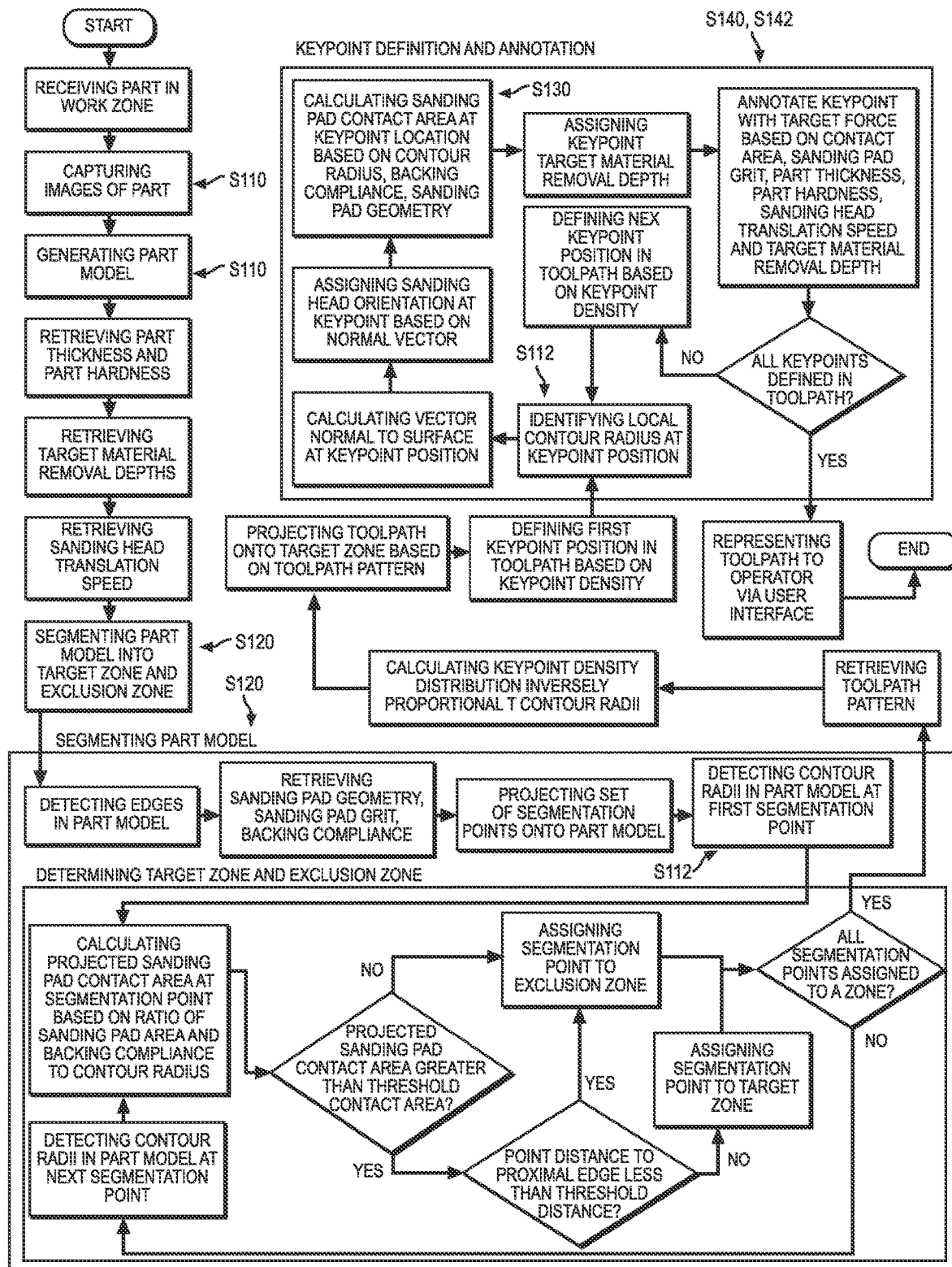
FIG. 5 is a flowchart representation of a variation of the first method.
Figure 6:
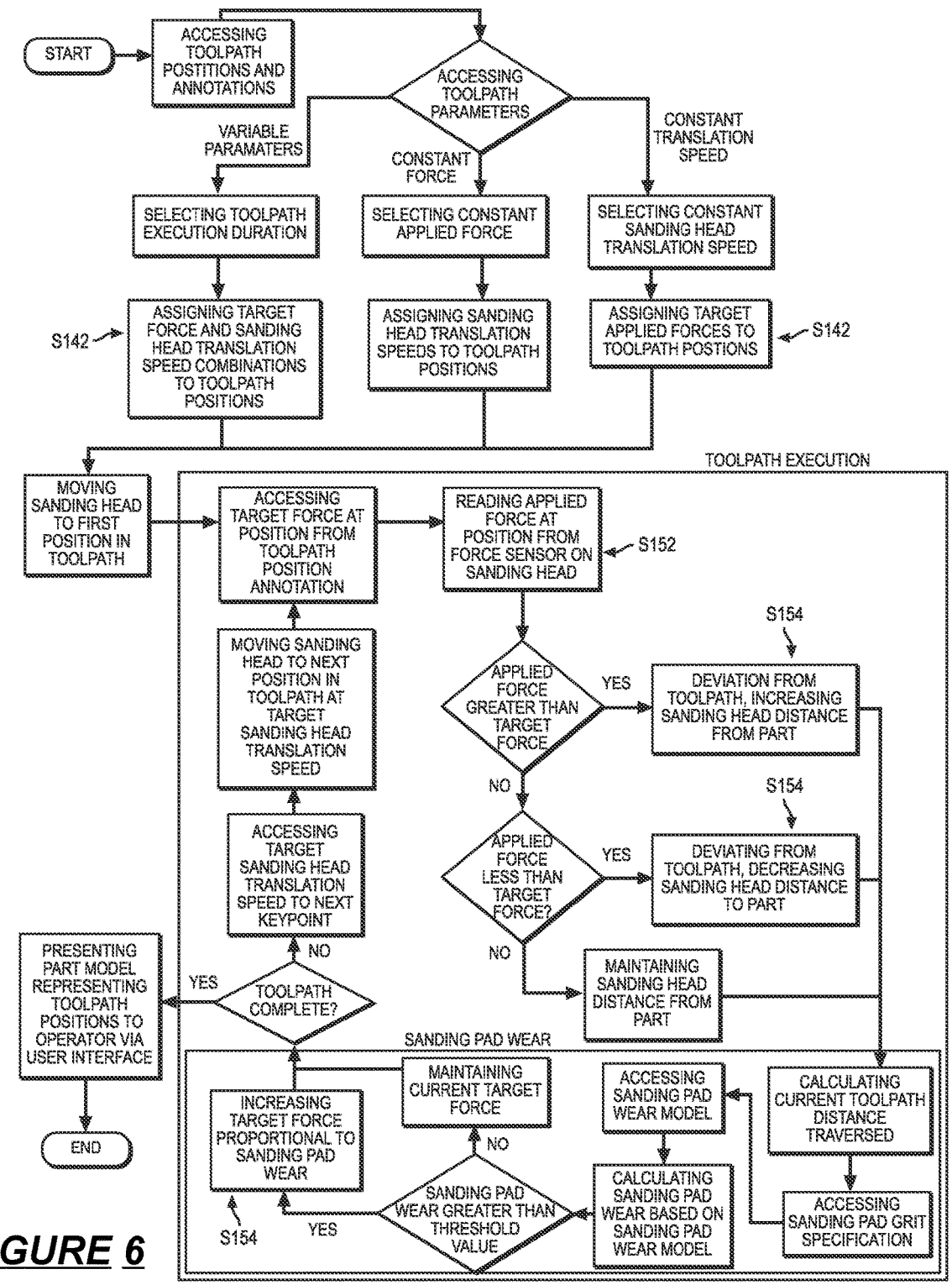
FIG. 6 is a flowchart representation of a variation of the first method.

In one implementation as shown in FIGS. 1 and 5, the controller 115 segments the part model into a target zone by identifying a pixel within the edges of the part. The controller 115 then identifies the local curvature radius at the pixel as a concave curvature, more than a first threshold radius, and/or identifies the local curvature radius at the pixel as a convex curvature, more than a second threshold radius. In response, the controller 115 assigns the pixel to a target zone in the part model.

In another implementation, the controller 115 can access the tool characteristics to retrieve a geometry 123 of the sanding pad 121 and a sanding head 120 compliance 126 of the backing 125. The controller 115 calculates—based on the geometry 123 of the sanding pad 121 and sanding head 120 compliance 126 of the backing 125—a first minimum contour radius of a surface contour, such that a threshold percentage of the sanding pad 121 area can make contact with the surface contour when a nominal target force is applied, the target force retrieved from the operator profile and/or the part processing profile.

In another implementation, the controller 115 segments the part model into a target zone by identifying a pixel exhibiting a contour radius less than the first minimum contour radius, and assigning the pixel to the target zone.

For example, the controller 115 accesses the tool characteristics to retrieve a first geometry 123 of the sanding pad 121 of six inches and a compliance 126 of the backing 125 of 25% (i.e., semi-rigid backing 125), and retrieves a nominal target force from the operator profile. The controller 115 calculates the threshold percentage of the sanding pad 121 area in contact with the part as 50%, based on the compliance 126 of the backing 125 and the nominal target force. The controller 115 calculates the first minimum contour radius as ten feet based on the geometry 123 of the sanding pad 121 the sanding head 120 compliance 126 of the backing 125 and the nominal target force. The controller 115 segments pixels with a local curvature radius of ten feet or greater within a first target zone. The controller 115 then projects a first toolpath onto the target zone within the part model.

The controller 115 then accesses the tool characteristics to retrieve a second geometry 123 of the sanding pad 121 of four inches and a compliance 126 of the backing 125 of 50% (i.e., semi-flexible backing 125), and retrieves the nominal target force from the operator profile. The controller 115 calculates the threshold percentage of the sanding pad 121 area in contact with the part as 75%, based on the compliance 126 of the backing 125 and the nominal target force. The controller 115 calculates the first minimum contour radius as one foot based on the geometry 123 of the sanding pad 121 and the compliance 126 of the backing 125. The controller 115 segments pixels with a local curvature radius of one foot or greater within a second target zone. The controller 115 projects a second toolpath onto the second target zone within the part model.

The controller 115 then accesses the tool characteristics to retrieve a third geometry 123 of the sanding pad 121 of two inches and a compliance 126 of the backing 125 of 25% (i.e., semi-rigid backing 125), and retrieves the nominal target force from the operator profile. The controller 115 calculates the threshold percentage of the sanding pad 121 area in contact with the part as 25%, based on the compliance 126 of the backing 125 and the nominal target force. The controller 115 calculates the first minimum contour radius as one inch based on the geometry 123 of the sanding pad 121 and the compliance 126 of the backing 125. The controller 115 segments pixels with a local curvature radius of one inch or greater within a third target zone. The controller 115 projects a third toolpath onto the third target zone within the part model.

The controller 115 then sequences the first toolpath, the second toolpath, and the third toolpath into a single processing cycle, including tool change events between the conclusion of the first toolpath and the commencement of the second toolpath, and between the conclusion of the second toolpath and the commencement of the third toolpath, to process all target zones of the part.

In one variation of this example, the robotic system includes an automated tool changer, configured to receive a first sanding head 120 from the end effector 112, and dispense a second sanding head 120 to the end effector 112, the end effector 112 configured to selectively disengage the first sanding head 120 and selectively engage the second sanding head 120. The robotic system engages the automated tool changer to exchange sanding head 120S of different sizes when transitioning from the first toolpath to the second toolpath, and from the second toolpath to the third toolpath.

In another variation of this example, in response to conclusion of the first toolpath, the controller 115 generates and transmits a prompt to the operator to manually change the first sanding head 120. Following a manual exchange of the first sanding head 120 for a second sanding head 120, the robotic system continues along the second toolpath.

Thus, the robotic system can sequence the first toolpath, the second toolpath, and the third toolpath to process all target zones on the part in the shortest duration of time by covering the greatest area of the part with a sanding head 120 of greatest geometry 123, and progressively reducing the geometry 123 of sanding pad 121 to process contours of smaller and smaller radii.

Therefore, the robotic system can segment the part model into target zones wherein the robotic system can process the part. The robotic system can detect the local contour radius at locations on the part and compare the local contour radius to the size of the sanding head 120 and the sanding head 120 compliance 126 to identify zones of the part wherein the sanding head 120 can access the part surface and autonomously segment the target zone from the remainder of the part.

7.1.2 Exclusion Zones

In one implementation as shown in FIGS. 1 and 5, the controller 115 segments the part model into an exclusion zone by: identifying a pixel within the edges of the part; and identifying the local curvature radius at the pixel is a concave curvature less than a first threshold radius and/or identifying the local curvature radius at the pixel is a convex curvature less than a second threshold radius. In response, the controller 115 assigns the pixel to an exclusion zone in the part model.

In another implementation, the controller 115 can access the tool characteristics to: retrieve a geometry 123 of the sanding pad 121 and/or a sanding head 120 compliance 126 of the backing 125 and calculate a first minimum contour radius of a surface contour, based on the geometry 123 of the sanding pad 121 and/or sanding head 120 compliance 126 of the backing 125, that a threshold percentage of the sanding pad 121 area can make contact with the surface contour when a nominal target force—retrieved from the operator profile and/or the part processing profile—is applied.

The controller 115 segments the part model into an exclusion zone by identifying a pixel exhibiting a contour radius greater than the first minimum contour radius and assigning the pixel to the exclusion zone.

In one example, the controller 115 can segment an exclusion zone inaccessible to the sanding head 120 based on the properties of the sanding head 120 by: accessing a sanding pad 121 size; detecting the second region defining a concave contour; detecting a radius of curvature of the concave contour; and calculating a ratio of the sanding pad 121 size to the radius of curvature of the concave contour. In response to the ratio exceeding a threshold value, the controller 115 characterizes the second region as an exclusion zone. Additionally, the controller 115 can: further access a compliance 126 coefficient of a compliant backing 125; and calculate the threshold value based on the compliance 126 coefficient.

In another implementation, the controller 115 can segments the part model into an exclusion zone by: identifying different minimum curvature radii for different curvature types. For example, the controller 115 can identify a pixel within the boundary edges of the part and identify the local curvature at the pixel as a concave curvature. The controller 115 can identify the concave curvature radius as less than a first threshold radius, and in response assign the pixel to the exclusion zone. Alternatively, the controller 115 can identify a pixel within the boundary edges of the part and identify the local curvature at the pixel as a convex curvature. The controller 115 can identify the convex curvature radius as less than a second threshold radius—different from the first threshold radius—and in response assign the pixel to the exclusion zone.

In yet another implementation, the controller 115 can detect a variety of edges in the part model. The controller 115 can implement edge detection techniques to detect: a boundary part edge defining the part limit; and an internal part edge defining a feature edge, such as the edge of a boss, relief, or hole in the surface.

Additionally, the controller 115 can analyze the set of images to detect masking tape edges on the part. The controller 115 can segment the part model into an exclusion zone by: identifying a pixel within an area bounded by a set of edges of the part; and assigning the pixel to an exclusion zone in the part model.

In another example, the controller 115 detects a region within the part model inaccessible to the sanding head 120 by: detecting a set of edges on the first part model; defining the region on the part model bounded by the set of edges as an exclusion zone in the part model; and defining the set of keypoints on the part model outside of the exclusion zone.

In another example, the controller 115 can detect the set of edges on the part model and segment an exclusion zone by: detecting masking tape on a surface contour of the part; detecting a first edge of the masking tape delineating a target zone of the first region from the exclusion zone; and defining the region on the part model bounded by the first edge of the masking tape as an exclusion zone.

In yet another example, the controller 115 can detect a first region representing a target zone within the part model by: detecting a region of a first color on the part in the part model; defining the first region on the first part model as a target zone in the first part model; detecting an area of a second color in the part model, the first color different from the second color; and defining the set of keypoints within the first region of the part model representing the target zone.

In one variation of this implementation, the controller 115 further segments the part model into an exclusion zone by: identifying a pixel within a minimum distance of an edge of the part; and assigning the pixel to an exclusion zone in the part model.

In another variation of this implementation, the controller 115 can annotate the three-dimensional model with the exclusion zone and present the three-dimensional model to the operator to confirm the exclusion zone prior to initiation of the processing cycle.

For example, the controller 115 can represent target zones and execution zones within a three-dimensional model and request confirmation from an operator by: detecting a set of edges in the three-dimensional model; defining the region on the part model within the set of edges as an exclusion zone in the part model; and annotating the three-dimensional model with a virtual representation of the exclusion zone, presenting the three-dimensional model annotated with the virtual representation of the exclusion zone to the operator; and prompting the operator to confirm the exclusion zone on the three-dimensional model.

In another implementation, the controller 115 can access the tool characteristics to retrieve the dimensions of the sanding head 120 and end effector 112. The controller 115 generates an end effector 112 simulator, based on the dimensions of the sanding head 120 and end effector 112, to predict collisions between the end effector 112 (and/or other elements of the robotic manipulator no) and elements of the part.

For example, the controller 115 identifies an overhang at a first keypoint along the toolpath and accesses the end effector 112 simulator to calculates a target position and orientation of the end effector 112 at the first keypoint, proximal the overhang. The end effector 112 simulator indicates a collision between the end effector 112 and the overhang based on the dimensions of the sanding head 120 and end effector 112 and the calculated target position and orientation of the end effector 112. In response, the controller 115 assigns the first keypoint to the exclusion zone.

Therefore, the robotic system can autonomously segment the part model into exclusion zones, that are either inaccessible to or undesirable for the robotic manipulator 110 to process with the sanding head 120 based on the capabilities of the robotic system and the desired surface finish. The robotic system can also segment areas of the part that may be damaged by the sanding head 120 or by the parameters of a particular process, such as low-radius concave or convex contours, which can be damaged or ground away during an aggressive paint stripping cycle with a coarse grit 122. The robotic system can also model the path of the end effector 112 and predict a location of a potential collision and segment the area as an exclusion inaccessible to the sanding head 120.

8. Toolpath

Generally, for each target zone in the part model, the controller 115 projects a toolpath including a set of keypoints onto the target zone, with a toolpath pattern retrieved from the operator profile.

In one implementation as shown in FIGS. 2 and 3, the controller 115 generates a toolpath by projecting a boustrophedonic raster pattern, defined by the operator profile, onto the target zone, and projects a set of keypoints onto the boustrophedonic raster pattern at a fixed interval.

For example, the controller 115 can define the first set of keypoints on the first region within the first part model by: retrieving a boustrophedonic raster pattern defining a first sequence of raster legs in a first orientation and offset by a pitch distance less than a width of the sanding head 120 and a second sequence of raster legs in a second orientation and connecting the first sequence of raster legs. The controller 115 then: projects the boustrophedonic raster pattern onto the first region within the first part model; and defines the first set of keypoints along the boustrophedonic raster pattern at local densities proportional to local radii of surface contours within the first region within the first part model.

In one variation of the example implementation, the controller 115 projects the set of keypoints onto the boustrophedonic raster pattern defined by the operator profile, onto the target zone at an interval inversely proportional to the local curvature radius at each keypoint (i.e., a smaller local curvature radius results in a greater density of keypoints in the toolpath.)

For example, the controller 115 can: characterize surface contours within the first part model by detecting local radii of curvature of the surface contour within discrete areas of the part model; and define the first set of keypoints on the first region within the first part model by projecting keypoints onto the part model at densities inversely proportional to local radii of curvature. By increasing the density of keypoints inversely to local radii of curvature, the controller 115 produces a more detailed segment of the toolpath for tighter control of the sanding head 120 through tight contours.

8.1 Target Force Values by Curvature

Generally, the controller 115 populates each keypoint with a translational (e.g., (x, y, z)) position and a rotational (e.g., pitch, yaw, and roll) orientation, such as within machine coordinates of the robotic system. The controller

115 also: derives a target force (or pressure) value for each keypoint; and annotates each keypoint with its target force value. (Alternatively, the controller 115 can segment the toolpath into regions and implement methods and techniques described herein to assign target force values to individual regions of the toolpath. Additionally or alternatively, the controller 115 can segment the toolpath into groups of keypoints and implement methods and techniques described herein to assign target force values to individual groups of keypoints along the toolpath.)

In one implementation as shown in FIG. 5, for a first keypoint, the controller 115: retrieves (e.g., reads, extracts) a local curvature radius of the part at the first keypoint from the part model; accesses the set of tool characteristics to retrieve the geometry 123 of the sanding pad 121 and the compliance 126 of the backing 125; projects the area of the sanding pad 121 onto the part; calculates a contact area between sanding pad 121 and the part surface based on the sanding pad 121 area, the compliance 126 of the backing 125, and the local curvature radius when a) the sanding head 120 is positioned such that the sanding pad 121 is centered at the first keypoint, b) the axis of the sanding head 120 is oriented normal to the part surface at the first keypoint, and c) the sanding pad 121 is in contact with the part surface; and calculates a target force value at the first keypoint proportional to the contact area between the sanding pad 121 and the part surface. Accordingly, the controller 115 can assign a lower target force to the first keypoint for a lower estimated sanding pad 121 contact area around the first keypoint and a higher target force to the first keypoint for a higher estimated sanding pad 121 contact area around the first keypoint in order to achieve a consistent or target sanding pressure between the sanding pad 121 and the entire surface of the part, and thus achieve consistent material removal and high surface quality uniformity.

In one variation, the controller 115 calculates a target force for the first keypoint directly from local part curvature by: extracting a local radius of curvature of the part at the first keypoint; retrieving a predefined grit 122 specification of the sanding pad 121, traversal speed, and/or the part processing profile for the part; and inserting the local radius of curvature and the processing values into a predefined model to convert this local curvature radius into the target force for the first keypoint.

8.2 Target Force Values by Edge Proximity

In another implementation in which the first keypoint is located proximal an edge of the target zone as shown in FIG. 5, the controller 115: projects the area of the sanding pad 121 onto the part; calculates a contact area between sanding pad 121 and the part surface based on the sanding pad 121 area, and location of the keypoint when the sanding head 120 is positioned such that a) a first region of the sanding pad 121 is in contact with the part surface within the target zone, b) and a second region of the sanding pad 121 extends beyond the part boundary edge when the sanding head 120 is centered at the first the first keypoint, and c) the axis of the sanding head 120 is oriented normal to the part surface at the first keypoint; and defines the target force proportional to the first region of the sanding pad 121, in contact with the part surface within the boundary of the target zone. For example, the controller 115 can calculate a first contact area for each region of the first toolpath by, for each region of the first toolpath: calculating an intersection of the geometry 123 of the sanding head 120, projected onto the region in the part model, and the part model; and calculating a first contact area for the region based on the intersection.

8.3 Target Force Values by Contact Area

In one implementation as shown in FIGS. 2-3 and 5-6, the controller 115 calculates a target force at a first keypoint in the toolpath by: retrieving a nominal translation speed, (i.e., one foot per second) from the operator profile; retrieving the geometry 123 of the sanding pad 121 and the compliance 126 of the backing 125; projecting the area of the sanding pad 121 onto the part; calculating a contact area between the sanding pad 121 and the part surface based on the sanding pad 121 area, the compliance 126 of the backing 125, and the local curvature radius when the sanding pad 121 is centered at the first keypoint and the axis of the sanding head 120 is oriented normal to the part surface at the first keypoint; and calculating a target force value at the first keypoint proportional to the contact area between the sanding pad 121 and the part surface and proportional to the nominal translation speed (i.e., faster translation speed results in a higher target force.)

For example, the controller 115 can: retrieve a nominal translation speed of the sanding head 120 for a region of the toolpath; define a target force value of the sanding head 120 on the part proximal the region proportional to a first contact area between the sanding head 120 and the part surface; and proportional to the nominal translation speed. The controller 115 can: read a sequence of force values from the sensor including a force sensor 116 coupled to the sanding hand; and deviate from the toolpath to maintain the sequence of force values within the threshold difference of the set of target force values.

8.4 Target Force Values by Pressure

In another example, the robotic system accesses the operator profile to retrieve a nominal traversal speed of one foot per second and accesses the part processing profile to retrieve a maximum pressure for the part. Generally, as the sanding head 120 translates at the nominal traversal speed along the toolpath and encounters a convex region of the surface exhibiting a decreasing radius of curvature, the contact area of the sanding head 120 on the part decreases, such as proportional to the decreasing radius of curvature of the part. If the robotic system maintains a consistent force application on this part over this region of the part, the pressure exerted by the sanding head 120 on the part may increase, thereby yielding increased material removal from the part. Therefore, in order to maintain a consistent pressure exerted on the part and/or to maintain this pressure below the maximum pressure, the controller 115 can: characterize a contact area between the sand pad the part across this region of the part; and assign decreasing target force values along this segment of the toolpath.

Similarly, as the sanding head 120 moves across a region of the part characterized by increased radius of curvature, the contact area of the sanding pad 121 increases and the pressure applied by the sanding head 120 decreases. Accordingly, the controller 115 can assign increasing target force values along this segment of the toolpath.

In another implementation, the controller 115 calculates a target pressure on the part surface inversely proportional to the contact area of the sanding head 120 on the part and proportional to the target force. The robotic system modulates the target force based on the local surface contour radius, and therefore the contact area of the sanding head 120, to achieve the target pressure across the part.

In one variation, the controller 115 retrieves a maximum pressure for the part from the part processing profile, accesses the sanding pad 121 size, and sets the target force such that the pressure exerted by the sanding pad 121 on the part does not exceed the maximum part pressure.

In one example, the controller 115 accesses a maximum applied pressure for the part and, for each region of the first toolpath: calculates a maximum force for the region based on the maximum applied pressure and a first contact area between the first sanding head 120 and the part surface proximal the region; and defines a target force value of the sanding head 120 on the part less than the maximum force.

8.5 Target Force Values by Geometry

In another implementation, the controller 115 calculates a target translation speed at a first keypoint by: retrieving a target force of the sanding head 120 against the part and a maximal nominal force for the part from the part processing profile; calculating a contact area between the sanding pad 121 and the part based on geometry 123 of the sanding pad 121 and compliance 126 of the backing 125; and calculating a target translation speed at the first keypoint proportional to the contact area between the sanding pad 121 and the part surface and proportional to the target force. (i.e., lower contact area—due to small radius of curvature at the keypoint—results in higher translation speed as to not exceed the maximum nominal force for the part surface).

In one example, the controller 115 can retrieve the set of nominal processing parameters by retrieving a nominal applied sanding head 120 force and, for each region of the toolpath, assigning the nominal applied sanding head 120 force. The controller 115 can then, for each region of the toolpath, assign a target sanding head 120 translational speed of the sanding head 120 on the part inversely proportional to a contact area between the sanding head 120 and the part surface proximal the region; and proportional to the nominal applied sanding head 120 force. The controller 115 can then move the sanding head 120 along the toolpath according to target sanding head 120 translational speeds assigned to regions of the toolpath. The controller 115 reads a sequence of force values from the sensor including a force sensor 116 coupled to the sanding hand; and deviates from the toolpath to maintain the sequence of force values within the threshold difference of the set of target force values.

8.6 Target Force Values by Grit

In another implementation, the controller 115 defines the target force proportional to the grit 122 specification of the sanding head 120 to achieve a target material removal depth on the part.

For example, the controller 115 can access the set of tool characteristics of the sanding head 120 by accessing a first grit 122 specification of a first sanding pad 121 applied to the sanding head 120. The controller 115 then: accesses a first material removal depth range for the first part; and accesses a first tool translation speed preference. The controller 115 can then define the first set of target force values: proportional to the material removal depth range; proportional to first tool translation speed preference; and inversely proportional to the first grit 122 specification. The controller 115 then controls the robotic system to move the sanding head 120 along the first sequence of positions and orientations according to the first tool translation speed preference.

The controller 115 can then: access a second grit 122 specification of a sanding pad 121 applied to the sanding head 120; and access a second finish profile defining a second tool translation speed preference, and a second sanding force preference. The controller 115 then: defines a second traversal speed along the toolpath based on the second tool translation speed preference and the second grit 122 specification; and defines a second set of preference force values based on the second sanding force preference and the second grit 122 specification.

Later, the robotic system: moves the sanding head 120 along the sequence of positions and orientations, defined by the set of keypoints, relative to the first part, at the second traversal speed; reads a second sequence of forces values from the force sensor 116 in the robotic system; interpolates a second set of target force values along the toolpath based on the second set of preference force values; and selectively adjusting positions of the end effector 112 relative to the part to maintain the sequence of force values within a threshold difference of the second set of preference force values.

In a similar variation, the controller 115 calculates a target force exerted by the sanding head 120 on the part during execution of the toolpath to affect material removal from the part surface based on the material properties of the part (e.g., hardness), the tool characteristics of the sanding head 120 (e.g., grit 122 of sanding pad 121), and action parameters of the robotic system (e.g., sanding head 120 traversal speed.)

8.7 Processing Parameters by Sanding Torque

In another implementation, the controller 115 calculates a target torque on the axis of the sanding head 120 at a first keypoint by: retrieving a nominal translation speed, (i.e., one foot per second) from the operator profile; calculating a contact area between sanding pad 121 and the part based on geometry 123 of the sanding pad 121 and compliance 126 of the backing 125; and calculating a target torque at the first keypoint proportional to the contact area between the sanding pad 121 and the part surface and proportional to the nominal translation speed (i.e., faster translation speed results in a higher target torque.)

For example: the robotic manipulator 110 includes a torque sensor coupled to the sanding head 120 and configured to output signals representing torque values between a sanding pad 121 on the sanding head 120 and local areas of the part in contact with the sanding pad 121. The controller 115 defines target sanding torques across the part proportional to radii of local surface contours represented in the part model. The robotic manipulator 110 is configured to modulate a sanding pad 121 speed of the sanding head 120 to align torque values, between the sanding pad 121 and local areas of the part, to the target sanding torques while navigating the sanding head 120 along the toolpath.

Therefore, the robotic system can calculate the target force of the sanding head 120 on a part based on one or a multiple of several part parameters and/or system parameters to achieve the target force with high accuracy for a variety of different part geometries, materials, and/or processing protocols. The robotic system can also vary system parameters during execution of the toolpath in real time, such as the sanding head 120 translation speed, in response to fluctuations in the detected applied force, to achieve the target force.

8.8 Translation Speed Modulation

In another implementation, the robotic system modulates the force exerted by the sanding head 120 and the translation speed of the sanding head 120 for each keypoint in the set of keypoints.

For a first keypoint, the robotic system: calculates a force and translation speed combination at the first keypoint based on the part processing profile, local part contour radius at the keypoint, sanding pad 121 contact area, and/or grit 122 specification, to nominally achieve the target force exerted on the part surface by the sanding head 120, as defined in the part processing profile. The controller 115 interpolates a force and translation speed combination between the first keypoint and a second keypoint in the toolpath. The controller 115 repeats the foregoing process for each keypoint in the set of keypoints and assembles the keypoints into a tool path with a minimum duration that maintains the force exerted on the part less than the maximum force for the part as defined in the part processing profile.

For example: the controller 115 accesses the set of tool characteristics of the sanding head 120 to access a grit 122 specification of the sanding pad 121 and retrieve a minimum material removal depth for the part and a maximum toolpath execution duration. The controller 115 then defines the target execution value for each region of the first toolpath, for each region of the first toolpath by assigning a target translation speed to the region inversely proportional to the maximum toolpath execution duration. The controller 115 further assigns a target force value to the region: proportional to a contact area of the sanding head 120 on the part proximal the region; inversely proportional to the grit 122 specification of the sanding pad 121; proportional to the minimum material removal depth; and proportional to the target translation speed.

The robotic system then: moves the sanding head 120 along the toolpath according to target sanding head 120 translational speeds assigned to regions of the toolpath; reads a sequence of force values from the sensor including a force sensor 116 coupled to the sanding hand; and deviates from the toolpath to maintain the sequence of force values within the threshold difference of the set of target force values.

Alternatively, the controller 115 can assemble the set of keypoints, defined by the set of force and translation speed combinations, into a tool path that maintains the most consistent traversal speed, to preserve final pattern uniformity. Alternatively, the controller 115 can assemble the set of keypoints, into a tool path that maintains the most consistently achieves the target force exerted on the part less as defined in the part processing profile. Alternatively, the controller 115 can assemble the set of keypoints, into a tool path which exerts the minimum force to complete the surface finish process within a set duration (i.e., one hour). Alternatively, the controller 115 can assemble the set of keypoints, into a tool path which optimizes the finish consistency across the part surface.

Therefore, the robotic system can modulate both translation speed of the sanding head 120 and exerted force on the part surface by the sanding head 120 to assemble a particular toolpath to accomplish a particular goal within the surface process.

In another example, the operator loads a truck tailgate exhibiting areas with spilled truck bed liner and selects a paint stripping protocol with a maximum duration of one hour. The robotic system segments a zone of the part exhibiting truck bed liner in the toolpath and assigns a higher target force and lower translation speed to the zone to increase dwell time and therefore material removal depth of the hard truck bed liner. Elsewhere in the toolpath, the robotic system assigns a lower target force and a higher translation speed to reduce dwell time and material removal depth, as well as reduce overall process execution time.

Therefore, the robotic system can modulate the target force and the translation speed of the sanding head 120 to achieve a process result, as opposed to fixing target force and modulating translation speed or fixing translation speed and modulating force. Thereby the robotic system can efficiently process a part exhibiting highly variable surface geometry 123 or composition.

8.9 Other Keypoints

The robotic system can repeat the forgoing processes to calculate target execution values (e.g., target force, target translation speed, target pressure) for each other keypoint, group of keypoints, or region defined on the part model. The controller 115 then assembles the positions, orientations, and target execution values of these keypoints into a toolpath, such as in the form of a software code file (e.g. a machine specific programming language or G-code equivalent) defining translational positions and rotational orientations, target forces, sanding head 120 feed speeds, and/or sanding pad 121 rotation speeds.

8.10 Keypoint Order

In one variation the controller 115 orders the keypoint in the toolpath based on characteristics of corresponding regions of the part.

For example, the controller 115 can segment the part model or the toolpath into a set of zones characterized by coating thickness, such as including: a first zone characterized by a first coating thickness; and a second zone characterized by a second coating thickness less than the first coating thickness. The controller 115 then: assigns a second target force value—based on the second coating thickness—to a first region (e.g., a first group of keypoints) of the toolpath that falls within the first zone; assigns a second target force value—less than the first force value based on the second coating thickness—to a second region (e.g., a second group of keypoints) of the toolpath that falls within the second zone; and defines a processing order for the set of regions of the toolpath such that the first region of the toolpath precedes the second region of the toolpath based on the first coating thickness exceeding the second coating thickness and such that the sanding pad 121 may strip more material from the thicker coating in the first region when fresh and then strip less material from the thinner coating in the second region once worn.

Therefore, the controller 115 can generate a toolpath—executable by the robotic system—containing a sequence of keypoints: that define positions and orientations of the sanding head 120; and that are annotated with process protocol parameters governing actions of the robotic system while processing the part in order to achieve target results of a selected process protocol for the part.

8.11 Toolpath Visualization and Confirmation

In one variation, the controller 115 further: projects the toolpath onto the part model (e.g., a three-dimensional model of the part); presents this annotated three-dimensional model to the operator; animates the toolpath projection on the annotated three-dimensional model; prompts the operator to confirm (or modify) the toolpath; and then executes the toolpath as described below once confirmed by the operator.

Therefore, the robotic system can: capture a set of images, depth maps, etc. during a scan cycle; assemble this set of images into a three-dimensional model of the part; generate a toolpath based on this three-dimensional part model; render the three-dimensional model; project the toolpath onto the three-dimensional model; present the three-dimensional model with projected toolpath to the operator; and prompt the operator to confirm the projected toolpath. In response to confirmation of the toolpath by the operator, the robotic system can then execute the toolpath during the subsequent processing cycle.

9. Processing Cycle and Toolpath Execution

In one implementation as shown in FIGS. 3-5, the robotic system autonomously executes the toolpath by: accessing the operator profile to retrieve a nominal translation speed; accessing the part processing profile to retrieve the target force for the part; nominally translating the sanding head 120 to a translational position and a rotational orientation, defined by the first keypoint; detecting an applied force value at the sanding head 120 via a force sensor 116 configured to detect a force between the sanding pad 121 and the part surface; and selectively deviating from the toolpath at the first keypoint by adjusting the position of the sanding head 120—in a direction parallel a normal vector extending from the keypoint perpendicular to the surface at the keypoint—to achieve the target force on the part. The robotic system continues executing the toolpath by: interpolating the toolpath between a first keypoint and a second keypoint by interpolating a set of translational positions and rotational orientations between the first keypoint and a second keypoint; interpolating the normal vector, the target force, between the first keypoint and a second keypoint; and selectively deviating from the interpolated toolpath by adjusting the position of the sanding head 120—in a direction parallel the normal vector—to achieve the target force on the part.

The controller 115 can repeat the foregoing process for each keypoint in the set of keypoints to complete the toolpath.

9.1 Sanding Head Fixed to End Effector

In another implementation, wherein the sanding head 120 is fixed to the end effector 112, the robotic system executes a nominal toolpath by: accessing the operator profile to retrieve a nominal translation speed; translating the sanding head 120 (by translating the end effector 112), to the first keypoint defined by the first translational position and rotational orientation, the sanding pad 121 centered at the first keypoint, and the sanding head 120 axis aligned coaxial to a vector extending normal to the surface at the keypoint, stored in the toolpath. The robotic system continues executing the toolpath by: reading an applied force at the sanding head 120; calculating a difference between the applied force and the target force greater than a threshold difference; and, in response, the robotic manipulator 110 translates the sanding head 120 along the normal vector toward or away from the first keypoint to reduce the difference between the applied force and the target force below the threshold difference, thereby achieving the target force at the first keypoint. The robotic system interpolates the toolpath, translational positions and rotational orientations, the vector normal to the surface, the target force, between the first keypoint and a second keypoint.

The robotic system implements closed-loop controls to reduce the difference between the applied force of the sanding head 120 against the part surface and the interpolated target force below the threshold difference along the interpolated path segment, and modulates the applied force by translating the sanding head 120 along the interpolated normal vector toward or away from the part surface, thereby deviating from the toolpath, while simultaneously translating the sanding head 120 along the interpolated path between the first keypoint and the second keypoint at the nominal translation speed.

The robotic system can repeat the foregoing for all remaining keypoints along the toolpath.

For example, the robotic system: moves the sanding head 120 along a first sequence of positions and orientations, defined by the first set of keypoints, relative to the first part; reads a first sequence of force values from a force sensor 116 in the robotic system; interpolates a first set of target force values along the first toolpath based on the target force values stored in the first set of keypoints; and selectively adjusts positions of the end effector 112 relative to the first part to maintain the first sequence of force values within a threshold difference of the first set of target force values.

In another example: the controller 115: defines the orientation of the sanding head 120 on the first part for each keypoint in the first set of keypoints by defining a first vector normal to a surface contour of the first part model at a first position on the first part defined by the first keypoint; and executes the toolpath, at the robotic system by navigating the end effector 112 to the first position on the first part, and orienting the sanding head 120 to locate an axis of the sanding head 120 coaxial with the first vector.

9.2 Sanding Head Mounted to Linear Actuator

In one implementation as shown in FIG. 4, the robotic manipulator 110 includes a linear actuator 118 configured to extend and retract the sanding head 120 from the end effector 112 in a direction parallel to the axis of the sanding head 120, and including a load cell configured to detect force values. The robotic manipulator 110 translates the end effector 112 through the toolpath without deviating from the toolpath by: accessing the operator profile to retrieve the nominal translation speed; nominally translating the sanding head 120 to a first keypoint defined by the translational position and rotational orientation, defined by the first keypoint; interpolating a set of translational positions and rotational orientations between the first keypoint and a second keypoint in the toolpath; interpolating the normal vector, the target force, between the first keypoint and a second keypoint; detecting an applied force value at the linear actuator 118 via the load cell; and selectively extending and retracting the linear actuator 118 to achieve the target force on the part.

In one example: the robotic manipulator 110 includes: a force sensor 116 coupled to the sanding head 120 and configured to output signals representing the force value of the sanding head 120 normal to local areas of the part in contact with the sanding head 120; and a linear actuator 118 configured to extend and retract the sanding head 120, on the end effector 112, parallel to an axis of the sanding head 120.

The robotic manipulator 110 is configured to deviate from the toolpath to align the force value to the target sanding force on the part by selectively extending and retracting the linear actuator 118 based on the force value read from the force sensor 116.

In one variation of this implementation, the linear actuator 118 is a pneumatic cylinder including a pressure sensor configured to detect air pressure within the cylinder. The robotic system implements a pressure model to convert the detected pressure into an applied force value and calculate a difference between the target force value and the applied force value. In response to a difference calculated between the applied force value and the target force value greater than a threshold difference, the robotic system modulates the air pressure within the pneumatic cylinder to reduce the difference between the applied force and the target force below the threshold difference, thereby achieving the target force on the part.

In one example, the robotic system includes a pneumatic linear actuator 118 configured to extend and retract the sanding head 120, on the end effector 112, parallel to an axis of the sanding head 120. The robotic system includes: a pressure sensor coupled to the pneumatic linear actuator 118 and configured to output signals representing a pressure in the pneumatic cylinder; and a robotic manipulator 110 is configured to read a sequence of pressure values at the pneumatic linear actuator 118 from the pressure sensor and modulate the pressure within the pneumatic linear actuator 118 to maintain the target force of the sanding head 120 on the part.

In another variation of this implementation, the linear actuator 118 is an electromechanical linear actuator 118 configured to detect extension and retraction resistance at the extending member of the linear actuator 118. The robotic system implements a resistance model to convert the detected resistance into an applied force value and calculate a difference between the target force value and the detected force value.

In response to a difference calculated between the applied force value and the target force value greater than a threshold difference, the robotic system modulates the extension and retraction resistance of the electromechanical linear actuator 118 to eliminate the difference between the applied force and the target force below the threshold difference, thereby achieving the target force on the part.

In another example: The robotic system includes an electromechanical linear actuator 118 configured to: extend and retract the sanding head 120, on the end effector 112, parallel to an axis of the sanding head 120; and detect extension and retraction resistance. During the processing period, the robotic manipulator 110 is configured to modulate the extension and retraction of the electromechanical linear actuator 118 based on the detected extension and retraction resistance to maintain the target force of the sanding head 120 on the part.

9.3 Sanding Pad Wear Model

In one implementation as shown in FIG. 3, at a first keypoint, the controller 115 calculates pad wear 127 and adjusts the target force based on pad wear 127 of the sanding pad 121 by: retrieving a length of toolpath traversed prior to arrival at the first keypoint; accessing the sanding pad wear model to derive a pad wear 127 of the sanding pad 121 at the first keypoint based on the grit 122 of the sanding pad 121; and increasing the target force based on the pad wear 127 in Block S156.

For example, the controller 115 executes in Block S156 to access a sanding pad wear model defining pad wear 127 based on the grit 122 of the sanding pad 121. The robotic manipulator 110 tracks the toolpath length traversed by the sanding pad 121 attached to the sanding head 120 and increases the target force value proportional to the toolpath length, based on the sanding pad wear model.

In one variation of this example, the robotic system includes a position sensor configured to detect the rotary speed of the sanding pad 121. The controller 115 accesses a grit 122 of sanding pad 121, and the robotic system is configured to apply the pad wear model to: calculate a current material removal rate of the sanding pad 121 based on the pad wear 127, the grit 122 of sanding pad 121, the rotary speed of the sanding head 120, the length of the toolpath traversed, and the target sanding force; and calculate a difference between the current material removal rate and a target material removal rate. In response to the difference between the current material removal rate and the target material removal rate exceeding a threshold value, the robotic system modulates the applied sanding force to reduce the difference below the threshold value to achieve the target material removal rate.

Therefore, the robotic system can autonomously translate the sanding head 120 along a toolpath, detect the force applied to the part surface by the sanding head 120, and selectively deviate from the toolpath to align the applied force to a target force defined in the part processing profile, thereby achieving the target force across the part surface with high accuracy. Thus, the robotic system can implement a low-precision toolpath and achieve a consistent application of a target force across target zones of the surface of a part with high accuracy and high repeatability across multiple parts.

10. Post Processing and Projection of Results

In one implementation, the controller 115 retrieves a record of the positions and orientations of the sanding head 120 during the processing cycle and generates a process history of the processing cycle defining: processed segments of the part model, processed by the robotic system during the processing cycle; and unprocessed segments of the part model, not processed by the robotic system during the processing cycle.

The controller 115 annotates the three-dimensional model by projecting the process history onto the three-dimensional model and presents the annotated three-dimensional model to the operator at the conclusion of the processing cycle.

By reviewing the annotated three-dimensional model, the operator can identify areas of the part that will need to be processed again, either by hand, or with a different sanding head 120 or processing protocol. The operator can make a decision regarding a next action on the part by referencing the annotated three-dimensional model.

For example, the controller 115 can present the annotated three-dimensional model of an automobile hood including a ram air scoop, depicting a processed zone including the area of the hood within a threshold distance of the hood edge, excluding a ram air opening of the ram air scoop, and depicting an unprocessed zone including the ram air opening in the hood, and an area extending a threshold distance from the edge of the hood.

In another implementation, the robotic system (i.e., controller 115) can present the annotated three-dimensional model representing areas of the part expected to be processed, but unprocessed during execution of the processing cycle. The operator can review the annotated three-dimensional model and, if necessary, make adjustments to the robotic system for future processing cycles.

In one example, the controller 115: accesses the three-dimensional model; and, during a scan cycle preceding the first processing cycle, renders the three-dimensional model; projects the toolpath onto the three-dimensional model; presents the three-dimensional model to an operator; and prompts the operator to confirm the toolpath. The controller 115 can then, following the first processing cycle: access a record of positions of the sanding head 120 during execution of the first toolpath; identify a set of processed regions of the part based on the record of positions of the sanding head 120; identify an unprocessed region, in the set of regions, of the toolpath based on a difference between the toolpath and the set of processed regions; annotate the three-dimensional model with the set of processed regions and the unprocessed region of the toolpath; and present the three-dimensional model, annotated with the set of processed regions and the unprocessed region, to the operator.

Therefore, the robotic system can output a final analysis at the conclusion of a process delineating areas of the part processed, unprocessed, expected to be processed, represented visually in a three-dimensional model of the part, and present the results to an operator for review. The operator can thus minimize hand-finishing of the part by reviewing an accurate record of the areas processed.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   during a first scan cycle:
      autonomously manipulating a robotic system to traverse an optical sensor across a first part occupying a work zone; and
      via the optical sensor, capturing a first set of optical images depicting the first part;
   assembling the first set of optical images into a first part model representing surface contours of the first part;
   detecting a first region of the first part model exhibiting a first surface contour accessible to the sanding head based on a set of tool characteristics of a sanding head;
   detecting a second region of the first part model exhibiting a second surface contour inaccessible to the sanding head based on the set of tool characteristics;
   defining a first set of keypoints proximal the first region of the first part model, each keypoint in the first set of keypoints:
      defining a first position of the sanding head on the first part when occupying the keypoint;
      defining a first orientation of the sanding head on the first part when occupying the keypoint; and
      defining a first target force value applied by the sanding head to the first part when occupying the keypoint; and
   assembling the first set of keypoints into a first toolpath for traversal by the sanding head.

2. The method of claim 1, further comprising, during a first processing cycle, at the robotic system:
   traversing the sanding head along a first sequence of positions and orientations defined by the first set of keypoints;
   reading a first sequence of force values from a force sensor in the robotic system;
   interpolating a first set of target force values along the first toolpath based on the target force values stored in the first set of keypoints; and
   selectively adjusting positions of the end effector relative to the first part to maintain the first sequence of force values within a threshold difference of the first set of target force values.

3. The method of claim 2:
   wherein defining the first set of keypoints comprises defining a first vector located at a first position on the first part model and normal to a surface of the first part model at the first position; and
   further comprising executing the toolpath at the robotic system by:
      traversing the end effector to the first position on the first part; and
      orienting the sanding head to locate an axis of the sanding head coaxial with the first vector.

4. The method of claim 2:
   further comprising accessing the set of tool characteristics of the sanding head comprising a first grit specification of a first sanding pad applied to the sanding head;
   further comprising:
      accessing a first material removal depth range for the first part; and
      accessing a first tool translation speed preference;
   wherein defining the first set of keypoints comprises, for a first keypoint in the first set of keypoints:
      defining a first target force value:
         proportional to the material removal depth range;
         proportional to the first tool translation speed preference; and
         inversely proportional to the first grit specification; and
   wherein traversing the sanding head along the sequence of positions and orientations defined by first the set of keypoints comprises traversing the sanding head along the first sequence of positions and orientations according to the first tool translation speed preference.

5. The method of claim 4:
   further comprising accessing a first hardness of a first coating on the first part; and
   wherein defining the first set of keypoints comprises, for each keypoint in the first set of keypoints, defining a first target force value proportional to the first hardness.

6. The method of claim 1:
   further comprising accessing a part stripping profile assigned to the first part and specifying:
      a first material removal depth; and
      a first grit specification of a first sanding pad applied to the sanding head; and
   wherein defining the first set of keypoints comprises, for each keypoint in the first set of keypoints, defining a first target force value:
      proportional to the first material removal depth; and
      inversely proportional to the first grit specification.

7. The method of claim 1:
   further comprising, during a setup period preceding the first scan period:
      locating the optical sensor over the work zone at a first distance from the first part;
      capturing a first optical image of the work zone depicting the first part at a first resolution;
      detecting a first geometry of the first part within the work zone based on a first set of features extracted from the first optical image; and
      defining a scan path, at a second distance from the first part less than the first distance, based on the first geometry of the first part within the work zone; and
   wherein autonomously manipulating the robotic system and capturing the first set of optical images during the first scan period comprises:
      autonomously executing the scan path to traverse the optical sensor over the first part at the second distance from the first part; and
      capturing the first set of optical images depicting the first part at a second resolution greater than the first resolution.

8. The method of claim 1:
wherein detecting the second region of the first part model inaccessible to the sanding head comprises:
   detecting a set of edges on the first part model; and
   defining the second region of the first part model bounded by the set of edges as an exclusion zone in the first part model; and
wherein defining the first set of keypoints comprises defining the first set of keypoints proximal the first region of the first part model and outside of the exclusion zone.

9. The method of claim 8:
wherein detecting the set of edges on the first part model comprises:
   detecting a masking tape on a surface contour of the first part; and
   detecting a first edge of the masking tape delineating a target zone of the first region from the exclusion zone of the second region; and
wherein detecting the second region of the first part model comprises defining the second region, on the first part model, bounded by the first edge of the masking tape.

10. The method of claim 8:
wherein detecting the first region of the first part comprises detecting the first region characterized by a first color in the part model;
further comprising defining the first region of the first part model as a target zone in the first part model based on presence of the first color in the first region;
wherein detecting the second region of the first part model comprises detecting the second region characterized by a second color different from the first color; and
wherein defining the first set of keypoints comprises defining the first set of keypoints proximal the target zone.

11. The method of claim 1:
further comprising accessing the set of tool characteristics comprising a sanding pad size of the sanding head; and
wherein detecting the second region exhibiting a second surface contour inaccessible to the sanding head comprises:
   detecting the second region defining a concave contour;
   detecting a radius of curvature of the concave contour;
   calculating a ratio of the sanding pad size to the radius of curvature of the concave contour; and
   in response to the ratio exceeding a threshold value, characterizing the second region as an exclusion zone.

12. The method of claim 11:
further comprising accessing the set of tool characteristics comprising a compliance coefficient of a compliant backing; and
further comprising calculating the threshold value based on the compliance coefficient.

13. The method of claim 1, wherein defining the first set of keypoints comprises:
retrieving a boustrophedonic raster pattern defining:
   a first sequence of raster legs in a first orientation and offset by a pitch distance less than a width of the sanding head; and
   a second sequence of raster legs in a second orientation and connecting the first sequence of raster legs;
projecting the boustrophedonic raster pattern onto the first region of the first part model; and
defining the first set of keypoints along the boustrophedonic raster pattern at local densities proportional to local radii of surface contours within the first region of the first part model.

14. The method of claim 13:
wherein retrieving the boustrophedonic raster pattern comprises retrieving the boustrophedonic raster pattern from a first operator profile associated with a first operator operating the robotic system during the first scan cycle;
further comprising:
   receiving a second part within the work zone;
   accessing a second operator profile associated with a second operator; and
   during a second scan cycle:
      autonomously manipulating the robotic system to traverse the optical sensor across the second part; and
      at the optical sensor, capturing a second set of optical images depicting the second part;
   assembling the second set of optical images into a second part model representing the second part;
   characterizing surface contours within the second part model;
   detecting a third region of the second part model exhibiting a third surface contour accessible to the sanding head based on the set of tool characteristics;
   detecting a fourth region of the second part model exhibiting a fourth surface contour inaccessible to the sanding head based on the set of tool characteristics;
   retrieving a perpendicular double pass boustrophedonic raster pattern from the second operator profile defining:
      a third sequence of raster legs in a third orientation and offset by a pitch distance less than the width of the sanding head;
      a fourth sequence of raster legs in a fourth orientation and connecting the third sequence of raster legs;
      a fifth sequence of raster legs in a fifth orientation perpendicular to the third orientation and offset by the pitch distance less than the width of the sanding head; and
      a sixth sequence of raster legs in a sixth orientation and connecting the fifth sequence of raster legs;
   projecting the perpendicular double pass boustrophedonic raster pattern onto the third region of the second part model;
   for each keypoint in a second set of keypoints:
      defining a second position of the sanding head on the second part;
      defining a second orientation of the sanding head on the second part; and
      defining a second target force value of the sanding head on the second part; and
   assembling the second set of keypoints into a second toolpath, following the perpendicular double pass boustrophedonic raster pattern, at local densities proportional to local radii of surface contours within the third region of the second part model, for execution by the robotic system.

15. The method of claim 1:
further comprising characterizing surface contours within the first part model based on local radii of curvature of surface contours within discrete areas of the part model; and wherein defining the first set of keypoints comprises projecting keypoints onto the first region of the part model at densities inversely proportional to local radii of curvature.

16. The method of claim 1:

further comprising detecting a first local radius of curvature of a first local surface contour within the first region of the part model; and wherein defining the set of keypoints comprises:
- defining a first keypoint intersecting the first local surface contour of the part model; and
- defining a first target force at the first keypoint proportional to the first local radius of curvature proximal the first keypoint.

17. The method of claim 1:

wherein capturing the first set of optical images depicting the first part comprises capturing a first set of color images and a first set of depth images;

wherein assembling the first set of optical images into the first part model comprises assembling the first set of color images and the first set of depth images into a color three-dimensional model of the first part;

further comprising, during the first scan cycle:
- rendering the color three-dimensional model;
- projecting the toolpath onto the color three-dimensional model;
- presenting the color three-dimensional model annotated with the toolpath to an operator; and
- prompting the operator to confirm the toolpath; and further comprising, during a processing cycle following the first scan cycle, at the robotic system, executing the toolpath in response to confirmation of the toolpath by the operator.

18. The method of claim 1, further comprising:

detecting a set of edges in the color three-dimensional model;

defining an exclusion zone, on the first part model, bounded by the set of edges;

annotating the color three-dimensional model with a virtual representation of the exclusion zone; and prompting the operator to confirm the exclusion zone on the color three-dimensional model.

19. The method of claim 1:

further comprising receiving the first part within the work zone prior to the scan cycle; and wherein assembling the first set of optical images into the first part model representing surface contours of the first part comprises:
- assembling the first set of optical images into the first part model representing the first part;
- accessing the set of tool characteristics of the sanding head mounted to the robotic system; and
- characterizing surface contours within the first part model.

\* \* \* \* \*